US008438320B2

(12) United States Patent
Srinivasan et al.

(10) Patent No.: US 8,438,320 B2
(45) Date of Patent: *May 7, 2013

(54) VARIOUS METHODS AND APPARATUS FOR ADDRESS TILING AND CHANNEL INTERLEAVING THROUGHOUT THE INTEGRATED SYSTEM

(75) Inventors: Krishnan Srinivasan, Cupertino, CA (US); Drew E. Wingard, Palo Alto, CA (US); Chien-Chun Chou, Saratoga, CA (US)

(73) Assignee: Sonics, Inc., Milpitas, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 12/573,669

(22) Filed: Oct. 5, 2009

(65) Prior Publication Data
US 2010/0042759 A1 Feb. 18, 2010

Related U.S. Application Data

(63) Continuation-in-part of application No. 12/402,704, filed on Mar. 12, 2009, now Pat. No. 8,108,648, which is a continuation-in-part of application No. 12/145,052, filed on Jun. 24, 2008.

(60) Provisional application No. 60/946,096, filed on Jun. 25, 2007.

(51) Int. Cl.
*G06F 13/00* (2006.01)

(52) U.S. Cl.
USPC .................................. 710/35; 710/33; 710/34

(58) Field of Classification Search ........................ None
See application file for complete search history.

(56) References Cited

U.S. PATENT DOCUMENTS

| 5,708,659 | A | * | 1/1998 | Rostoker et al. ............... 370/392 |
| 5,781,918 | A | * | 7/1998 | Lieberman et al. ................ 711/5 |
| 5,948,089 | A | | 9/1999 | Wingard et al. |
| 6,182,183 | B1 | | 1/2001 | Wingard et al. |
| 6,249,144 | B1 | * | 6/2001 | Agrawal et al. .................. 326/40 |
| 6,330,225 | B1 | | 12/2001 | Weber et al. |
| 6,393,500 | B1 | * | 5/2002 | Thekkath ......................... 710/35 |
| 6,466,825 | B1 | * | 10/2002 | Wang et al. ........................ 700/5 |
| RE37,980 | E | * | 2/2003 | Elkhoury et al. ............. 710/310 |
| 6,526,462 | B1 | | 2/2003 | Elabd |

(Continued)

FOREIGN PATENT DOCUMENTS

WO WO2009/002998 12/2008

OTHER PUBLICATIONS

Cross Reference to Related Applications Under 37 C.F.R. § 1.78, 2 pages, Jun. 30, 2011.

(Continued)

*Primary Examiner* — Henry Tsai
*Assistant Examiner* — Jing-Yih Shyu
(74) *Attorney, Agent, or Firm* — Rutan & Tucker, LLP

(57) ABSTRACT

Various methods and apparatus are described for a target with multiple channels. Address decoding logic is configured to implement a distribution of requests from individual burst requests to two or more memory channels making up an aggregate target. The address decoding logic implements a channel-selection hash function to allow requests from each individual burst request to be distributed amongst the two or more channels in a non-linear sequential pattern in channel round order that make up the aggregate target.

20 Claims, 15 Drawing Sheets

U.S. PATENT DOCUMENTS

| | | | |
|---|---|---|---|
| 6,578,117 | B2 | 6/2003 | Weber |
| 6,725,313 | B1 | 4/2004 | Wingard et al. |
| 6,874,039 | B2 | 3/2005 | Ganapathy et al. |
| 6,877,076 | B1 | 4/2005 | Cho et al. |
| 7,116,131 | B1 * | 10/2006 | Chirania et al. ............ 326/41 |
| 7,120,712 | B2 | 10/2006 | Wingard et al. |
| 7,120,765 | B2 | 10/2006 | Dodd et al. |
| 7,149,829 | B2 * | 12/2006 | Weber et al. ............. 710/243 |
| 7,155,554 | B2 * | 12/2006 | Vinogradov et al. ....... 710/305 |
| 7,194,561 | B2 | 3/2007 | Weber |
| 7,325,221 | B1 | 1/2008 | Wingard et al. |
| 7,543,088 | B2 * | 6/2009 | Weber et al. .............. 710/35 |
| 7,543,093 | B2 * | 6/2009 | Chou et al. ............... 710/105 |
| 7,552,292 | B2 * | 6/2009 | Hsieh et al. .............. 711/157 |
| 7,587,535 | B2 * | 9/2009 | Sawai ...................... 710/62 |
| 7,598,726 | B1 | 10/2009 | Tabatabaei |
| 7,852,343 | B2 * | 12/2010 | Tanaka et al. ............. 345/531 |
| 7,899,953 | B2 * | 3/2011 | Inoue ....................... 710/22 |
| 2002/0083256 | A1 | 6/2002 | Pannell |
| 2002/0129173 | A1 | 9/2002 | Weber et al. |
| 2002/0129210 | A1 * | 9/2002 | Arimilli et al. ............ 711/146 |
| 2003/0004699 | A1 | 1/2003 | Choi et al. |
| 2003/0023794 | A1 | 1/2003 | Venkitakrishnan et al. |
| 2003/0074520 | A1 | 4/2003 | Weber |
| 2003/0088721 | A1 | 5/2003 | Sharma |
| 2004/0010652 | A1 | 1/2004 | Adams et al. |
| 2004/0177186 | A1 | 9/2004 | Wingard et al. |
| 2005/0210164 | A1 * | 9/2005 | Weber et al. ............... 710/35 |
| 2006/0047890 | A1 | 3/2006 | Van De Waerdt |
| 2006/0147127 | A1 * | 7/2006 | Slavin ...................... 382/298 |
| 2006/0218315 | A1 * | 9/2006 | Okajima et al. ............ 710/35 |
| 2006/0229090 | A1 * | 10/2006 | LaDue ..................... 455/507 |
| 2007/0094429 | A1 | 4/2007 | Wingard et al. |
| 2007/0168620 | A1 * | 7/2007 | Leonard et al. ............ 711/141 |
| 2008/0084881 | A1 * | 4/2008 | Dharwadkar et al. ...... 370/392 |
| 2008/0086577 | A1 * | 4/2008 | Huang ...................... 710/35 |
| 2008/0235421 | A1 | 9/2008 | Jayaratnam et al. |
| 2008/0320254 | A1 | 12/2008 | Wingard et al. |
| 2008/0320255 | A1 * | 12/2008 | Wingard et al. ........... 711/157 |
| 2008/0320268 | A1 | 12/2008 | Wingard et al. |
| 2008/0320476 | A1 | 12/2008 | Wingard et al. |
| 2009/0235020 | A1 | 9/2009 | Srinivasan et al. |

OTHER PUBLICATIONS

Ahn, Jung Ho et al, The Design Space of Data-Parallel Memory Systems, IEEE, 12 pages, Nov. 2006.

EP 08780967.9 filed Jun. 25, 2008 Search Report dated Dec. 29, 2010.

Intel Dual-Channel DDR Memory Architecture White Paper informational brochure, Infineon Technologies North America Corporation and Kingston Technology, Company, Inc., 14 pages, Sep. 2003.

OCP (Open Core Protocol) Specification, Release 2.0, OCP International Partnership, OCP-IP Association, 210 pages, 2003.

PCT/US2008/068107 filed Jun. 25, 2008 International Preliminary Report on Patentability dated Jan. 15, 2010.

PCT/US2008/068107 filed Jun. 25, 2008 Search Report dated Oct. 8, 2008.

PCT/US2008/068107 filed Jun. 25, 2008 Written Opinion dated Oct. 8, 2008.

U.S. Appl. No. 12/145,257, filed Jun. 24, 2008 Non-Final Office Action dated Feb. 2, 2011.

Weber, Wolf-Dietrich et. al, A Quality-of-Service Mechanism for Interconnection Networks in System-on-Chips, 1530-1591/05, IEEE, 6 pages, 2005.

Weber, Wolf-Dietrich, Efficient Shared DRAM Subsystems for SOCs, Sonics, Inc, Systems on the ICs, pp. 6 pages, 2001.

Wingard, Drew, A Non-Blocking Intelligent Interconnect for AMBA-Connected SoCs, Sonics, Inc., CoWare Arm Developers Conference, 39 pages, Oct. 6, 2005.

Wingard, Drew, Socket-based Design Using Decoupled Interconnects, Interconnect-Centric Design for Advanced SOC and NOC, 30 pages, 2002.

Wingard, Drew, Sonics SOC Integration Architecture presentation, Systems-ON-ICS, 25 pages, Jan. 28, 1999.

Wingard, Drew, Tiles: the Heterogeneous Processing Abstraction for MPSoc presentation, Sonics, Smart Interconnect IP, 5 pages, Jul. 7, 2004.

Non-Final Office Action for U.S. Appl. No. 12/145,052 mailed Nov. 8, 2011, 27 pages.

ExParte Quayle Office Action for U.S. Appl. No. 12/402,704 mailed May 24, 2011, 7 pages.

U.S. Appl. No. 13/276,041, filed Oct. 18, 2011, Wingard et al.

Haverinen, Anssi, et al, SystemC™ based SoC Communication Modeling for the OCP™ Protocol, V1.0, Oct. 14, 2002, 39 pages.

Final Office Action for U.S. Appl. No. 12/145,052 mailed Mar. 20, 2012, 29 pages.

Advisory Action for U.S. Appl. No. 12/145,052 mailed Jul. 26, 2012, 6 pages.

Examiner's Answer for U.S. Appl. No. 12/145,052 mailed Nov. 7, 2012, 15 pages.

* cited by examiner

- CSHF(HCS_enable, HCS, LCS) := least signification 2 bits of ( (HCS & HCS_enables) + LCS
  - Assumption: HCS_enables is set to b'11
  - Address region: Low Channel Interleave Size=0x40, High Channel Interleave Size=0x1000

- MAddr[7:6]     MAddr[13:12]
  LCS   HCS     HCS_enable    CSHF(...)   To select
- b'00  b'00b'11    0x0        Channel 0
- b'01  b'00b'11    0x1        Channel 1
- b'10  b'00b'11    0x2        Channel 2
- b'11  b'00b'11    0x3        Channel 3

- b'00  b'01b'11    0x1        Channel 1
- b'01  b'01b'11    0x2        Channel 2
- b'10  b'01b'11    0x3        Channel 3
- b'11  b'01b'11    0x0        Channel 0

Figure 8

| Bits | Field | Default | Range | R/W | Exp | Description |
|---|---|---|---|---|---|---|
| 58:56 | HIGH_CHANNEL_SELECT_ENABLES | n/a | 0x0 ~ 0x7 | RO | Yes | High channel select enables (HCS_enables) is a bit vector to be used as an input by the channel selection hash function (CSHF). Ignored when NUM_CHANNELS == 0x1 or (HIGH_CHANNEL_INTERLEAVE_SIZE == 0x0 and !exported). |
| 52:48 | HIGH_CHANNEL_INTERLEAVE_SIZE | n/a | 0x08 ~ 0x20 | RO | Yes | High channel interleave size in # of bits for the multi-channel address region. Ignored when NUM_CHANNELS == 0x1 or (HIGH_CHANNEL_INTERLEAVE_SIZE == 0x0 and !exported). Encoding can be used to reduce the number of bits. |
| 44:40 | LOW_CHANNEL_INTERLEAVE_SIZE | n/a | 0x06 ~ 0x10 | RO | Yes | Low channel interleave size in # of bits for the multi-channel address region. Ignored when NUM_CHANNELS == 0x1. Encoding can be used to reduce the number of bits. |
| 35:32 | ACTIVE_TARGETS | n/a | 0x0 ~ 0xf | RO | Yes | Current active channel target set for the multi-channel address region. Ignored when NUM_CHANNELS == 0x1. |
| 21:16 | SIZE | n/a | 0x00 ~ 0x36 | RO | Yes | Encoded size of the (multi-channel) address region. |
| 10:08 | ADDR_SPACE | n/a | 0x0 ~ 0x7 | RO | Yes | Address space of the (multi-channel) address region. |

Figure 12

VARIOUS METHODS AND APPARATUS FOR ADDRESS TILING AND CHANNEL INTERLEAVING THROUGHOUT THE INTEGRATED SYSTEM

RELATED APPLICATIONS

This application is a continuation in part and claims the benefit of U.S. Provisional Patent Application Ser. No. 60/946,096, titled "An interconnect implementing internal controls," filed Jun. 25, 2007 as well as U.S. Utility patent application Ser. No. 12/145,052 titled "Various methods and apparatus to support transactions whose data address sequence within that transaction crosses an interleaved", filed Jun. 24, 2008 as well as U.S. Utility patent application Ser. No. 12/402,704 titled "Various methods and apparatus for address tiling" filed on Mar. 12, 2009.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to address tiling in an integrated circuit.

BACKGROUND OF THE INVENTION

The performance of a Dynamic Random Access Memory (DRAM) memory system is dependent on the accesses that are presented to it. A system with a high page-hit rate generally performs better than one with a lower page-hit rate. In order to improve the page hit rate, a concept of address tiling is introduced. Essentially, address tiling is the transformation on the system address bits to generate a memory address such that the page hit rate in the DRAM is improved. The memory scheduler attempts to improve DRAM utilization by preferring requests that hit the page over those that cause a page miss.

Channel interleaving may also improve DRAM performance. Chopping of burst requests by hardware in an integrated circuit can relieve the initiator from knowing the exact details of how the DRAM is organized.

SUMMARY OF THE INVENTION

Various methods and apparatus are described for communicating transactions between one or more initiator IP cores and multiple target IP cores coupled to an interconnect. The interconnect implements an address map with assigned address for the multiple target IP cores, including a first aggregate target with two or more memory channels that appears as a single target to the initiator IP cores. When a starting address of an initial word of requested bytes in a burst request and ending address of a last word of requested bytes in the burst request is detected that causes the requested bytes in that burst request to span across one or more memory channel address boundaries to fulfill all of the word requests in the burst request, then chopping occurs. Individual burst requests that cross the memory channel address boundaries from a first memory channel to a second memory channel within the first aggregate target are chopped into two or more chopped burst transactions from the same thread that still retain attributes of a 2D transaction including the 2D data's stride, height, and width, dimensions in the aggregate target. The chopped two or more burst transactions are chopped to fit within memory channel boundaries of the aggregate target. Address decoding occurs to implement a distribution of requests from each chopped burst transaction to the two or more memory channels making up the aggregate target. The address decoding logic implements a channel-selection hash function to allow requests from a first chopped burst transaction to be distributed amongst the two or more channels in a non-linear sequential pattern in channel round order that make up the aggregate target.

BRIEF DESCRIPTION OF THE DRAWINGS

The drawings refer to embodiments of the invention in which:

FIG. 8 illustrates a chart of the potential values of the three parameters, LCS, HCS, and HCS_enable in an example address decode and the resultant destination channel generated from the applied hash function.

FIG. 12 illustrates an example table for a configuration register that is user configurable.

Figure 1:
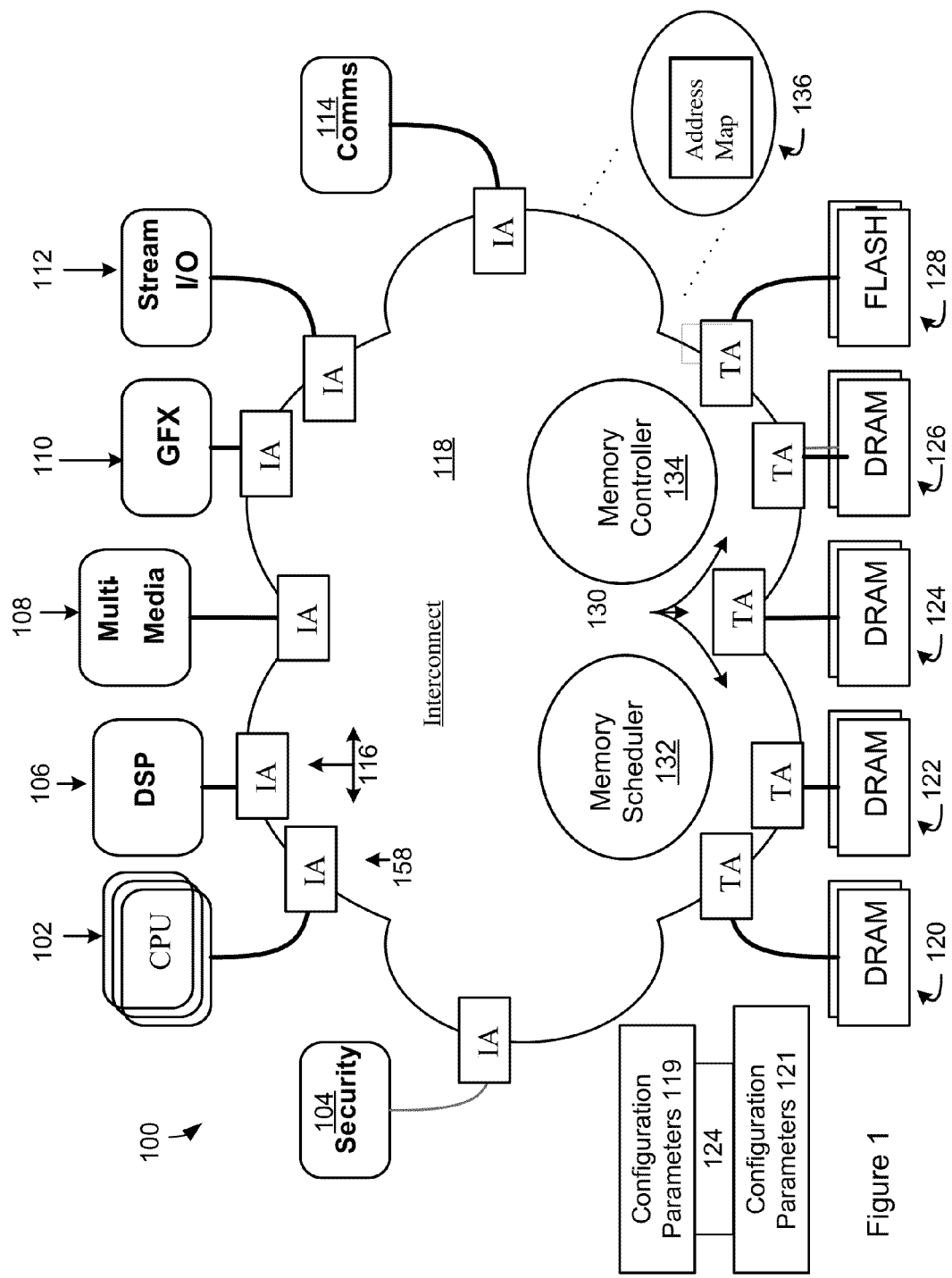
FIG. 1 illustrates a block diagram of an embodiment of a System-on-a-Chip having multiple initiator IP cores and multiple target IP cores that communicate read and write requests, as well as responses to those requests over an interconnect.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of memory channels in an aggregate target, etc., in order to provide a thorough understanding of the present invention. However, it will be apparent to a person of ordinary skill in the art that the present invention may be practiced without these specific details. In other instances, well known components or methods have not been described in detail, but rather in a block diagram in order to avoid unnecessarily obscuring the present invention. Further, specific numeric references, such as first target, may be made. However, the specific numeric reference should not be interpreted as a literal sequential order, but rather interpreted that the first target is different than a second target. Thus, the specific details set forth are merely exemplary. The specific details may be varied from, and still be contemplated to be, within the spirit and scope of the present invention.

In general, a method, apparatus, and system are described, which generally relate to an integrated circuit having an interconnect that implements internal controls. The interconnect may maintain request path order; maintain response path order; interleave channels in an aggregate target with unconstrained burst sizes; have configurable parameters for channels in an aggregate target; chop individual transactions that cross channel boundaries headed for channels in an aggregate target; chop individual transactions that cross channel boundaries headed for channels in an aggregate target so that two or more or the chopped portions retain their 2D burst attributes; as well as implement many other internal controls.

Address decoding logic may direct burst request transactions to a target with multiple channels. The address decoding logic is configured to implement a distribution of requests from individual burst requests to two or more memory channels making up the aggregate target with multiple memory channels. The address decoding logic implements a channel-selection hash function to allow requests from each individual chopped up burst request to be distributed amongst the two or more channels in a non-linear sequential pattern in channel round order that make up the aggregate target.

Most aspects of the invention may be applied in most networking environments and an example integrated circuit such as a System-on-a-Chip environment will be used to flush out these aspects of the invention.

FIG. 1 illustrates a block diagram of an embodiment of a System-on-a-Chip having multiple initiator IP cores and multiple target IP cores that communicate read and write requests, as well as responses to those requests over an interconnect. Each initiator IP core such as a CPU IP core 102, an on-chip security IP core 104, a Digital Signal Processor (DSP) 106 IP core, a multimedia IP core 108, a Graphics IP core 110, a streaming Input-Output (I/O) IP core 112, a communications IP core 114, such as a wireless transmit and receive IP core with devices or components external to the chip, etc. and other similar IP cores may have its own initiator agent 116 to interface with the interconnect 118. Each target IP core, such as a first DRAM IP core 120 through a fourth DRAM IP core 126 as well as a FLASH memory IP core 128, may have its own target agent 130 to interface with the interconnect 118. Each DRAM IP core 120-126 may have an associated memory scheduler 132 as well as DRAM controller 134.

The Intellectual Property cores (IP) have self-contained designed functionality to provide that macro function to the system. The interconnect 118 implements an address map 136 with assigned address for the target IP cores 120-128, and potentially the initiator IP cores 102-114 in the system to route the requests, and potentially responses between the target IP cores 120-128 and initiator IP cores 102-114 in the integrated circuit. One or more address generators may be in each initiator IP core to provide the addresses associated with data transfers that the IP core will initiate to memories or other target IP cores. All of the IP cores may operate at different performance rates (i.e. peak bandwidth, which can be calculated as the clock frequency times the number of data bit lines (also known as data width), and sustained bandwidth, which represents a required or intended performance level). Most of the distinct IP cores communicate to each other through the memory IP cores 120-126 on and off chip. The DRAM controller 134 and address map 136 in each initiator agent 116 and target agent 130 abstracts the real IP core addresses of each DRAM IP core 120-126 from other on-chip cores by maintaining the address map and performing address translation of assigned logical addresses in the address map to physical IP addresses.

The memory controller 134 is configured to regulate data flow between the initiators and the target system memory (DRAM, etc.) The memory controller 134 and memory scheduler 132 coordinate to determine the types and speeds of the memory modules making up the system memory as well as the maximum size of each individual memory module and the overall memory capacity of the memory system. However, when the target memory is unable to keep up with the request demands of the initiators in the system, a bottleneck occurs, leaving one or more of the initiators with nothing to process. Under the single-channel architecture, any initiator with a bus speed greater than the memory speed could be susceptible to this bottleneck effect. However, with the multiple channels working simultaneously, configuration now appears as a single aggregate memory system but with doubling the amount of available memory bandwidth. Instead of a single memory channel, a second parallel channel, a third channel, etc is added. With two or more channels working simultaneously, the bottleneck is reduced and work flow is more evenly distributed over all of the discrete memory modules making up that aggregate memory system.

The address decoding logic may also be located inside an initiator agent such as agent 158, within the interconnect 118, or in a memory component such as memory scheduler 134.

The DRAM memory scheduler & memory controller may be connected downstream of a target agent or within the interconnect. Accordingly, one method for determining the routing of requests from initiators to targets is to implement an address mapping apparatus that associates incoming initiator addresses with specific target IP cores.

The interconnect 118 provides a shared communications bus between IP core sub-systems 120-128 and 102-114 of the system. All the communication paths in the shared communication bus need not pass through a single choke point, rather many distributed pathways may exist in the shared communication bus. The on-chip interconnect 118 may be a collection of mechanisms that may be adapters and/or other logical modules, along with interconnecting wires that facilitate address-mapped and arbitrated communication between the multiple Intellectual Property cores 102-114 and 120-128.

The interconnect 118 may be part of an integrated circuit, such as System-on-a-Chip, that is pipelined with buffering to store and move requests and responses in stages through the System-on-a-Chip. The interconnect 118 may have flow control logic that 1) is non-blocking with respect to requests from another thread, as well as with respect to requiring a response to an initial request before issuing a subsequent request from the same thread, 2) implements a pipelined protocol, and 3) maintains each thread's expected execution order. The interconnect 118 also may support multiple memory channels in a single aggregate target, with 2D and address tiling features, response flow control, chopping of individual burst requests, and distribution of requests headed to that aggregate target in either a linear or non-linear sequential pattern in channel round order. Each initiator IP core may have its own initiator agent to interface with the interconnect. Each target IP core may have its own target agent to interface with the interconnect.

The integrated circuit 100 may contain chopping logic that is configured to chop individual burst requests that cross the memory channel address boundaries from a first memory channel to a second memory channel within an aggregate target into two or more resulting chopped burst transactions with a height value greater than one, as well as stride and width dimensions, which are chopped to fit within memory channel address boundaries of the aggregate target.

The integrated circuit 100 may also contain address decoding logic that is configured to implement a distribution of requests from the chopped burst transactions to the two or more memory channels making up the first aggregate target. The address decoding logic implements a channel-selection hash function to allow requests from a first chopped burst transaction to be distributed amongst the two or more channels in a non-linear sequential pattern in channel round order that make up the first aggregate target.

Each memory module may be an IP core or multiple external DRAM chips ganged together to act as a single aggregate memory to match the width of a data word such as 64 bits or 128 bits. Each IP core and DRAM chip may have multiple banks inside that IP core/chip. Each channel in a memory module may contain one or more buffers that can store requests and/or responses associated with the channel. These buffers can hold request addresses, write data words, read data words, and other control information associated with channel transactions, and can help improve memory throughput by supplying requests and write data to the memory, and receiving read data from the memory, in a pipelined fashion. The buffers can also improve memory throughput by allowing a memory scheduler to exploit address locality to favor requests that target a memory page that is already open, as opposed to servicing a different request that forces that page to be closed in order to open a different page in the same memory bank.

One benefit of a multi-channel aggregate target is that it provides spatial concurrency to target access, thus increasing effective bandwidth over that achievable with a single target of the same width. An additional benefit is that the total burst size of each channel is smaller than the total burst size of a single channel target with the same bandwidth, since the single channel target would need a data word that is as wide as the sum of the data word sizes of each of the multiple channels in an aggregate target. The multi-channel aggregate target can thus move data between the SOC and memory more efficiently than a single channel target in situations where the data size is smaller than the burst size of the single channel target.

Connectivity of multi-channel targets may be primarily provided by cross-bar exchanges that have a chain of pipeline points to allow groups of channel targets to be separated on the die. The multiple channel aggregate target covers the high performance needs of digital media dominated SOCs in the general purpose (memory reference and DMA) interconnect space.

Also, the memory channels in an aggregate target may support configurable configuration parameters. The configurable configuration parameters flexibly support a multiple channel configuration that is dynamically changeable, and enable a single already-designed System-on-a-Chip design to support a wide range of packaging or printed circuit board-level layout options that use different on-chip or external memory configurations by re-configuring channel-to-region assignments and interleaving boundaries between channels to better support different modes of operation of a single package.

Interleaved Channels in an Aggregate Target

Many kinds of IP core target blocks can be combined and have their address space interleaved. The below discussion will use discreet memory blocks as the target blocks being interleaved to create a single aggregate target in the system address space. An example "aggregate target" described below is a collection of individual memory channels, such as distinct external DRAM chips, that share one or more address regions that support interleaved addressing across the aggregate target set. Another aggregate target is a collection of distinct IP blocks that are being recognized and treated as a single target by the system.

Figure 2:
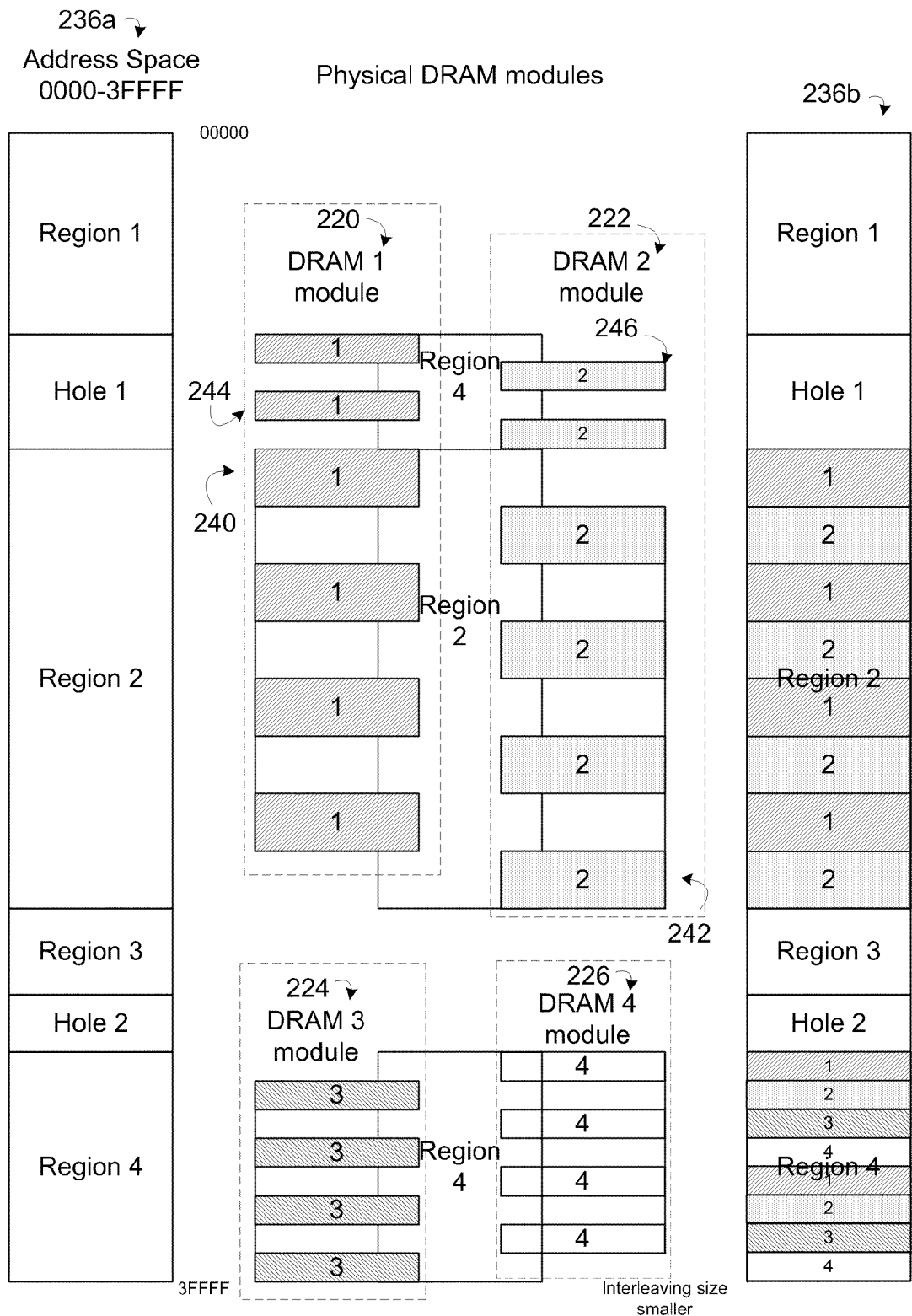
FIG. 2 illustrates an embodiment of a map of contiguous address space in which distinct memory IP cores are divided up in defined memory interleave segments and then interleaved with memory interleave segments from other memory IP cores.

FIG. 2 illustrates an embodiment of a map of contiguous address space in which distinct memory IP cores are divided up in defined memory interleave segments and then interleaved with memory interleave segments from other memory IP cores. Two or more discreet memories modules, including on chip IP cores and off chip memory cores, may be interleaved with each other to appear to system software and other IP cores as a single memory (i.e. an aggregate target) in the system address space. Each memory module may be an on-chip IP memory core, an off-chip IP memory core, a standalone memory bank, or similar memory structure. For example, the system may interleave a first DRAM module 220, a second DRAM module 222, a third DRAM module 224, and a fourth DRAM module 226. Each memory module 220-226 has two or more defined memory interleave segments, such as a first memory interleave segment 240 and a second memory interleave segment 242. The two or more defined memory interleave segments from a given discreet memory module are interleaved with two or more defined memory interleave segments from other discreet memory modules in the address space of a memory map 236*b*. The address map 236a may be divided up into two or more regions such as Region 1 thru Region 4, and each interleaved memory segment is assigned to at least one of those regions and populates the system address space for that region as shown in 236b, eventually being mappable to a physical address, in the address space.

For example, memory interleave segments from the first and second DRAM modules 220 and 222 are sized and then interleaved in region 2 of the address map 236b. Also, memory interleave segments from the third and fourth DRAM modules 224 and 226 are sized (at a granularity smaller than interleave segments in the first and second DRAM modules) and then interleaved in region 4 of the address map 236b. Memory interleave segments from the first and second DRAM modules 220 and 222 are also interleaved in region 4 of the address map 236b. Thus, a memory module may have defined memory interleave segments in the address space of two or more regions and can be implemented through an aliasing technique. Memory interleave segments from the first DRAM module 220 of a first size, such as a first memory interleave segment 240, are controlled by a configurable parameter of the second region in the address map 236b and interleave segments of a second size, such as a third memory interleave segment 244, are controlled by a configurable parameter of the fourth region in the address map 236b. Also, illustrated is a fourth memory interleave segment 246.

Thus, each memory module 220-226 has defined memory interleave segments and may have memory interleave segments of different sizes. Each corresponding region 4 in the system address map 236b has a configurable parameter, which may be programmable at run time or design time by software, to control the size granularity of the memory interleave segments in the address space assigned to that region potentially based on anticipated type of application expected to have transactions (including read and write requests) with the memory interleave segments in that region. As discussed, for example, the second region in the address map 236b has defined memory interleave segments allocated to that region from the first memory module 220 that have a configured size granularity at a first amount of bytes. Also, the fourth region in the address map 236b has defined memory interleave segments allocated to that region from the first memory module 220 that have a configured size granularity at a second amount of bytes. Also, each region, such as region 4, may have defined memory interleave segments allocated to that region from two or more memory modules 220-226.

Figure 3:
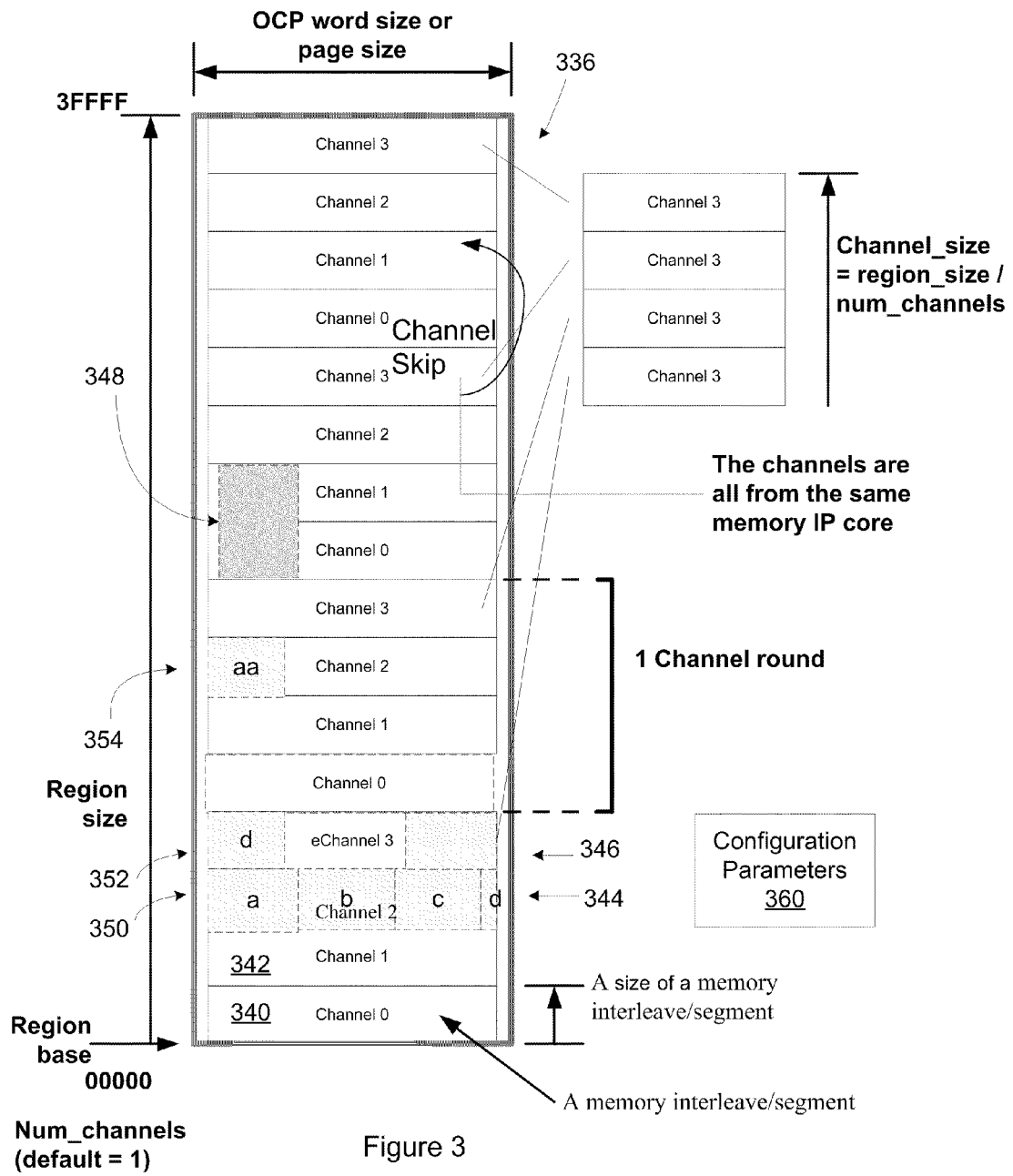
FIG. 3 shows an embodiment of a map of an address region for multiple interleaved memory channels.

FIG. 3 shows an embodiment of a map of an address region for multiple interleaved memory channels. The address region 336 of the address map may have address space for example from 00000 to 3FFFF in the hexadecimal numbering system. The address region 336 has interleaved addressing across multiple modules in an aggregated target. The global address space covered by the address region 336 may be partitioned into the set of defined memory interleave segments from the distinct memory modules. The defined memory interleave segments are non-overlapping in address space and collectively cover and populate the entire region 336 in that address space. Each interleaved memory segment from an on-chip or off-chip IP memory core/module is then sequential stacked with the defined interleaved segments from the other on-chip IP memory cores to populate address space in the address map. The maximum number of modules associated with a region may be a static value derived from the number of individual targets associated with the region, and from the nature of the target. Individual targets and multi-ported targets may have a single channel; multi-channel targets have up to 2, 4, or 8 channels. In an embodiment, a num_channels attribute is introduced for the "region" construct provided in the RTL.conf syntax and is used to indicate the maximum number of active channels an address region can have. The first defined memory interleave segment 340 in the region 336 is mapped to channel 0. The second defined memory interleave segment 342 in the region 336 is mapped to channel 1. The third defined memory interleave segment 344 in the region 336 is mapped to channel 2. The next defined memory interleave segment 346 in the region 336 is mapped to channel 3. This process continues until a memory interleave segment is mapped to the last channel active in this region. Channel 0 through channel 3 completes what is known as a "channel round" in the aggregate target. Thus, a channel round is a sequence of the memory interleave segments from all of the memory modules contributing to that aggregate target. The sequential stacking process of memory interleave segments in the address space assigned to a region is then repeated until enough channel rounds are mapped to completely cover the address space assigned to a particular region. This address region 336 will be treated as an aggregate target. A request for data, such as a first request 348 from that aggregate target in this region, may then require response data spans across multiple defined memory interleave segments and thus across multiple discrete memory IP cores. Also, a physical memory location in an on chip or off chip memory may actually be assigned to multiple regions in the system address space; and thus, have multiple assigned system addresses from that address map to the same physical memory location. Such multiple mapping, sometimes termed address aliasing, can be used to support multiple ways of addressing the same memory location or to support dynamic allocation of the memory location to either one region or the other, when the different regions have different interleaving sizes or channel groupings and may therefore have different access performance characteristics.

Each memory interleave segment is defined and interleaved in the system address space at a size granularity unconstrained by a burst length request allowed by the DRAM memory design specification by a system designer. The size granularity of memory interleave segment may be a defined length between a minimum DRAM burst length request allowed by the DRAM memory design specification configured into the DRAM and an anticipated maximum DRAM memory page length as recognized by the memory configuration. The size of this granularity is a configurable value supplied by user, such as software programmable. For example, the defined length supplied by the user may be between 64 Bytes and 64 Kilobytes.

Logically, this aggregated target presents itself as a single target to other IP cores but interleaves the memory interleave/segments in the address map of the system from multiple on-chip IP memory cores/memory modules. Thus, each DRAM IP core/channel may be physically divided up into interleaving segments at a size granularity supplied by the user. An initiator agent may interfacing the interconnect for a first initiator IP core and contain address decoding logic that interrogates the address map based on a logical destination address associated with a request to the aggregate target and its interleaved memory channels. The address decoding logic determines which memory channels will service the request and how to route the request to the physical IP addresses of each memory channel in the aggregate target servicing that request so that any IP core need not know of the physical IP addresses of each memory channel in the aggregate target.

The access load to each memory core automatically statistically spreads application traffic across the channels by virtue of the system designer configuring the size granularity of the interleave segments based on the address patterns associated with expected request traffic to that region/aggregated target. Requests sent by a single initiating thread to a multi-channel address region can cross the interleave boundary such that some transfers are sent to one channel target while others are sent to another channel target within the aggregate target. These requests can be part of a request burst that crossed a channel interleave boundary or independent transactions. Thus, if the expected request traffic for that system is dominated by requests that linearly access memory locations by virtue of the code in the programs they run, the size granularity is set up such that the several requests will be serviced by a first memory channel followed by maybe one request falling on both sides of a memory channel boundary followed by several requests being serviced by a second memory channel. The traffic spreading is due to system addressing, size granularity of the memory segment, and the memory channels being stacked sequentially. Thus, for example, requests a-c 350 from a same thread may be serviced exclusively by memory channel 2, while request d 352 is partially serviced by both memory channel 2 and memory channel 3. This way of sequentially stacking of defined memory interleave segments in the address space from different memory cores/modules allows the inherent spreading/load balancing between memory cores as well as takes advantage of the principle of locality (i.e. requests in thread tend to access memory address in locally close to the last request and potentially reuse the same access data).

Each region in the address map may set its own configurable parameter to control the size granularity of the memory interleave segments in the address space assigned to that region based on 1) address patterns associated with anticipated programs using memory in that region and 2) to take advantage of a principle of address locality of a type of anticipated program using the memory in that region. The interleaving of the multiple memory channels in the address space of the system address map enables automatic statistical spreading of application traffic across each of the memory channels over time, to avoid "hot spots" of uneven load balancing between distinct IP memory cores that can arise when too much traffic targets a subset of the channels making up the aggregated target. By the time the start of the next set of requests is serviced by channel 2, request aa 354, channel 2 should have responded to requests a-d while the requests between e and aa 354 from that thread have been serviced by the other channels making up the aggregate target.

Thus, the system may extract maximum throughput from modern DRAMs by exploiting parallelism and locality. Parallelism is utilized by pipelining memory requests to high-bandwidth DRAM components and also by interleaving accessing over multiple memory channels. Data-parallel memory systems may use memory access scheduling to enhance locality by ordering memory accesses. The ordering improves performance by reusing open rows (i.e. DRAM pages) and by minimizing internal bank conflicts and read-write turnaround penalties.

The system designer may know the typical request size or address increments based on that request size and the order in which request accesses typically occur. Different regions in the address map 336 may be configured to store different types of data/data objects. By defining the right size of granularity of each memory interleave segment within a given region, then several requests will access a same memory channel before needing to cross into another channel boundary, thereby tying up this single memory resource for a couple of cycles rather than multiple memory resources for the same number of cycles. Plus, the page buffer in a first memory core will have previously accessed data in the memory interleave segment and correspondingly stored accessed data in the page buffers of each memory channel in the aggregate target. A single memory access may require multiple DRAM commands to get the desired data to the corresponding page buffers. Having the data in page buffers and reusing that data for several cycles, improves efficiency based on the principle of locality. Also, interleaving memory interleave segments from memory channels at a coarse granularity/bigger size can also take advantage of inter-thread parallelism and reduces the need to keep page buffers from multiple DRAM banks/channels servicing the need of a single request thread. Instead, a single page buffer of one DRAM bank may service that request thread for multiple cycles. Thus, setting the size of a defined memory interleave segment relative to a size of a typical data structure being stored in that region of the address map to take advantage of the principle of locality. If multiple discreet memory cores exist in the system and three requests down the line, the program in the initiator wants the same data as the first request, then that data should still be already stored in the page buffer of the first memory core eliminating some cycles of delay to repeat putting that data back into the page buffer of the first memory channel.

Note, the principle of locality in computing is a concept that deals with the process of accessing a single resource multiple times. There are three basic types of locality that may be factored in: temporal; spatial; and sequential. Temporal Locality, i.e. locality in time, suggests if data or an instruction stored in memory is referenced, that same item will tend to be referenced again soon (e.g., loops, reuse). Spatial Locality, i.e. locality in space, suggests if data or an instruction stored in memory is referenced, items whose addresses are close by tend to be referenced soon. Sequential Locality suggests that a memory is typically accessed sequentially by linear programs. Generally, data from linear programs that is related are stored in consecutive locations in memory and in the case of data from multi-dimensional objects that are related that data is stored in a block pattern in memory. The principle of locality is due in part to the manner in which computer programs are created. Designers and users can anticipate the types of programs using the systems memory and set up regions to maximize these principles.

In an embodiment, some of the configurable parameters 360 for each address region a designer or user may supply are: Base_address of the region parameter; region_size parameter; address_space parameter; an association with a target parameter; an interleave_size_parameter; and an active_targets parameter. The interleave_size parameter defines in bytes the size of an interleave/defined memory segment unconstrained by the allowed system request burst length. The system address map supports interleave sizes that are binary powers between, for example, 64 Bytes and 64 Kilobytes, inclusively interleaved in the system address space at a size granularity between a minimum DRAM burst request length (64 Bytes) allowed by the DRAM memory design specification configured into the DRAM and an anticipated maximum DRAM memory page length as recognized by the memory configuration (64 Kilobytes). The region_size for regions should be 1 KB minimum and be large enough for at least 1 channel round=memory interleave segment size*number of memory modules allocating memory interleave segments in that region.

The address decoding logic is configured to implement a distribution of requests from the chopped burst transactions to the two or more memory channels making up the first aggregate target 336. The address decoding logic implements a channel-selection hash function to allow the requests from the burst to be distributed amongst the two or more channels in a non-linear sequential pattern in channel round order that makes up the aggregate target. The address decoding logic distributes requests from each chopped burst request across the two or more memory channels, and allows selectable skipping over one or more particular channels in channel round order in the aggregate target when distributing the requests from each chopped burst request to the two or more channels in an aggregate target based on the channel-selection hash function. For example, the address decoding logic may distribute requests from a burst request to channel 1, channel 2, channel 3, and then skip over channel 0 to channel 1 again. The hash function allows for many such non-linear sequential distribution patterns in channel round order.

Figure 4:
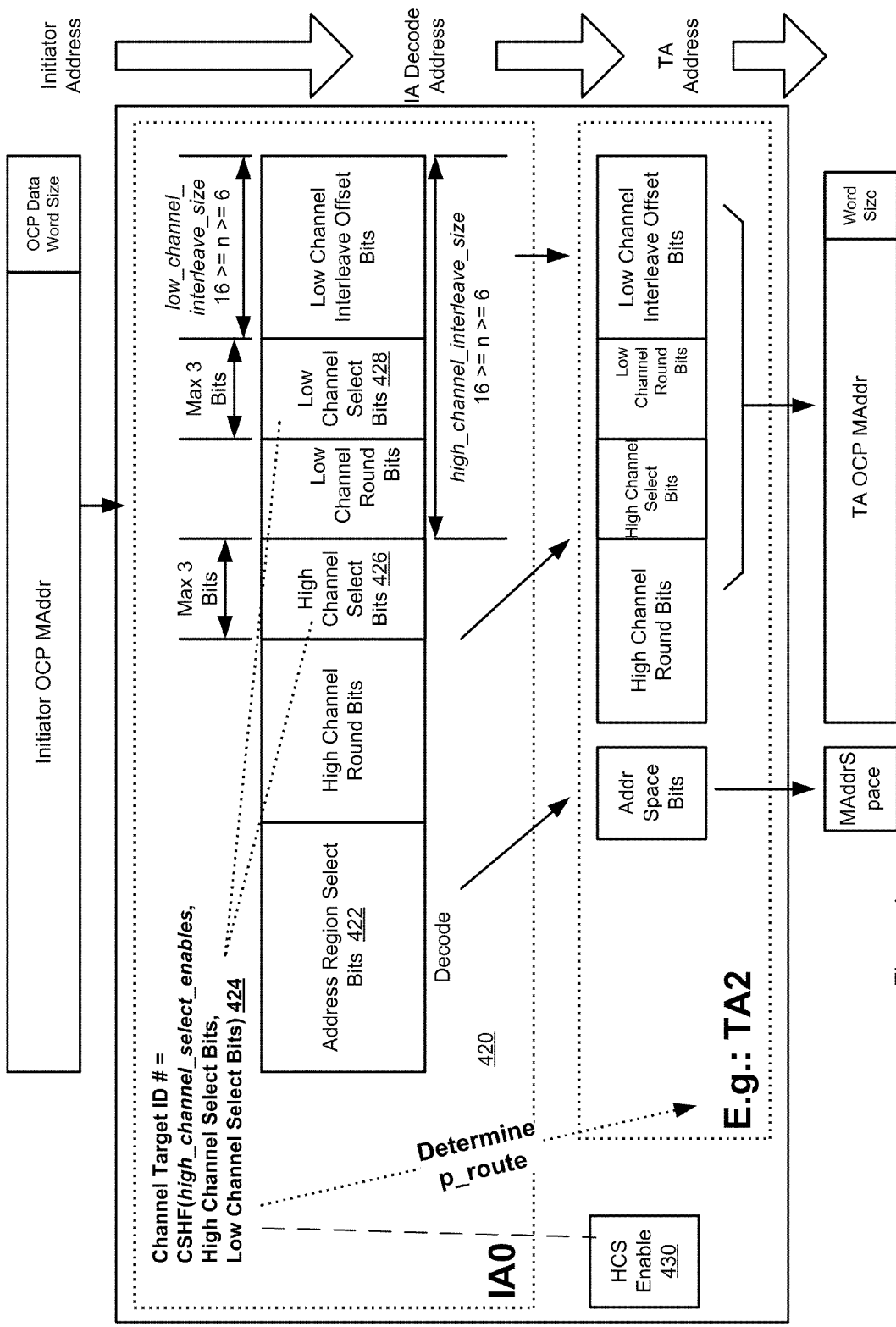
FIG. 4 illustrates a diagram of an embodiment of the address decoder logic in the initiator agent using low and high channel interleaving attributes for multi-channel address region decoding, in which the channel selection hash function is applied to the address bit format to achieve a non-linear high and low channel interleaving pattern in channel round order.

FIG. 4 illustrates a diagram of an embodiment of the address decoder logic in the initiator agent using low and high channel interleaving attributes for multi-channel address region decoding, in which the channel selection hash function is applied to the address bit format to achieve a non-linear high and low channel interleaving pattern in channel round order. The address decoding logic 420 examines a burst request's address from an initiator IP core, applies an address decoding operation including the channel-select hash function, and directs each request in the chopped burst request to the appropriate physical address associated with its corresponding destination memory channel within the aggregate target.

The address decoding logic 420 uses high and low channel interleaving to better distribute data across multiple channels when the distribution pattern is non-sequentially linear in channel round order. For example as shown in FIG. 4, the address decoding logic 420 can skip over particular channels when distributing the traffic data from a burst request over two or more channels in an aggregate target. Thus, the address decoding logic 420 uses the channel selection hash function 424 to interpret address bits in two or more separate sections of a request's address header 422 to distribute individual requests in a block burst request across multiple channels of an aggregate target in a distribution pattern that is non-sequentially linear in channel order. Thus, the address decoding logic 420 uses the bits in a high channel select bits field 426 and the bits in a low channel select field 428 in the request's address header in the channel-selection hash function 424 to determine a memory channel ID number of where a particular request will be sent.

The address decoder logic 420 interpolates/recognizes the bits in the standard low channel round bits field of the address in each chopped burst request now as defacto three distinct fields. The three fields are 1) a low channel round bits field, 2) a high channel select bits field 426, and 3) a high channel rounds bit field. The Most Significant Bits in the low channel round field are now recognized by the address decoder logic 420 as bits in the high channel select bits field 426 and the high channel rounds bit field. The three distinct fields have values that are used in the channel-selection hash function to determine the target ID of the corresponding memory channel in order to route the request in the aggregate memory target. The bits in the high channel select field 426, low channel select field 428, and a high_channel select enable value from a reference table 430 in the interconnect, are used by the address decoder logic 420 to determine the target ID of the correct channel to route the data to in the aggregate memory target. Thus, the channel select hash function 424 derives the actual physical address of the channels in the target memory that corresponds to the values in the high channel and low channel select bits 426, 428 and the high channel select enable value in the table 430. The high_channel_ select_enables (HCS_enables) is an 'A'-bit vector (2A equals the number of active channel targets of a multichannel target group, and 'A' can be 1, 2, or 3). The High Channel Select Bits (HCS) is also an A-bit vector. The Low Channel Select Bits (LCS) is also an A-bit vector. The channel-selection hash function used by the address decode logic may compute the Channel Target ID number based on the following parameters (high_channel_select_enable value from a reference table, the values in the High Channel Select Bits portion of the address in the request, and the values in the Low Channel Select Bits portion of the address in the request.)

The configuration reference table may be user configurable. A user can analyze typical data access pattern of initiator IP cores accessing each aggregate target to determine whether to select high and low channel bit distribution patterns, and a size of channels in that region, in order to select the distribution pattern of requests amongst channels in that region. The address decode logic 420 pulls one or more of its variable parameters from the user configurable register reference table.

In one specific implementation, the address decoder logic 420 calculates the channel-selection hash function as:

Least signification A bits of ((High Channel Select Bits & high_channel_select_enables bit vectors)+value of the Low Channel Select Bits).

However, a number of operations could be performed on these three variables to encode and decode the selection of the channel target ID number. The address decoder logic 420 uniquely selects a channel target ID # based on the three function parameters (HCS_enables, HCS, and LCS) from the address of the request from the initiator. The address decoding logic 420 distributes data across multiple channels by use of the address bits in the address of the request and the applied hash function allows selectable skipping over one or more particular channels in the aggregate target when distributing the traffic data from a burst request to the two or more channels in an aggregate target based on the channel-selection hash function 424.

The hash function may be turned off and not applied to a burst request when a user enters a specific value in a channel configuration register 430; thereby, allowing sole use of the low channel select bits to create a well-balanced traffic splitting among active channel targets in a linear sequential channel round order. The address decoder logic would just use low channel select bits in the address of the burst request to create a balanced traffic splitting among active memory channels in the first aggregate target in a linear sequential channel round order. If the initiator traffic consists mostly "sequential addressing" or "random-access addressing" patterns, for example, Incrementing bursts, small MBlockStride 2D bursts etc, then merely low channel selection will occur. However, for other bursts types, the user may program in both high and low channel interleaving by setting the values in the configuration register or the initiators aware of the multiple channel operation can set the address bits to take advantage of the non-linear access distribution. For instance, low channel interleaving plus high channel interleaving allows 2D BLCK bursts with large MBlockStride and MBlockHeight values to be split (legally) among more channel targets.

The address decoder logic 420 could be located in the initiator agent, target agent, or memory scheduler. In a specific embodiment, the address decoding logic is located in an initiator agent and each initiator agent that has a connection to an aggregate target is instantiated with one address decoder logic unit 420 per multi-channel address region associated with the aggregate target.

FIG. 4 illustrates an example OCP standard address bit format being interpreted by the address decode logic in a slightly different manner with the use of an applied the channel selection hash function 424 to achieve high and low channel interleaving. However, the address decoder logic 420 can apply the channel selection hash function to any standard address bit format.

Note, a hash function can be a well-defined algorithm or mathematical function which converts a large, possibly variable-sized amount of data into a small datum, usually a single integer that may serve as an index into an array. The hash function maps two or more keys, such as the high channel select bits 426 and low channel select bits 428, to a hash value. The values returned by a hash function are called hash values. The high channel select enables (HCS_enables) 430, low channel select bit 428, and high channel select bit 426 are a bit vectors to be used as an input values by the channel selection hash function 424.

No additional bits are put into the address header of the burst. Just the address bits already in there are recognized differently as high channel bits and the hash function is applied to change the conveyed meaning of the bits in the address of the request. The address decoder logic 420 uses various combinations of portions of the address header to determine which channel will store and send data associated with a burst request. The combinations of the bits in the Low Channel Select field (LCS) 428, HCS High Channel Select field 426, and High Channel Select enable value in the reference register 430 in the interconnect determine which channel in the region will receive that block of data from the burst write request.

Figure 5:
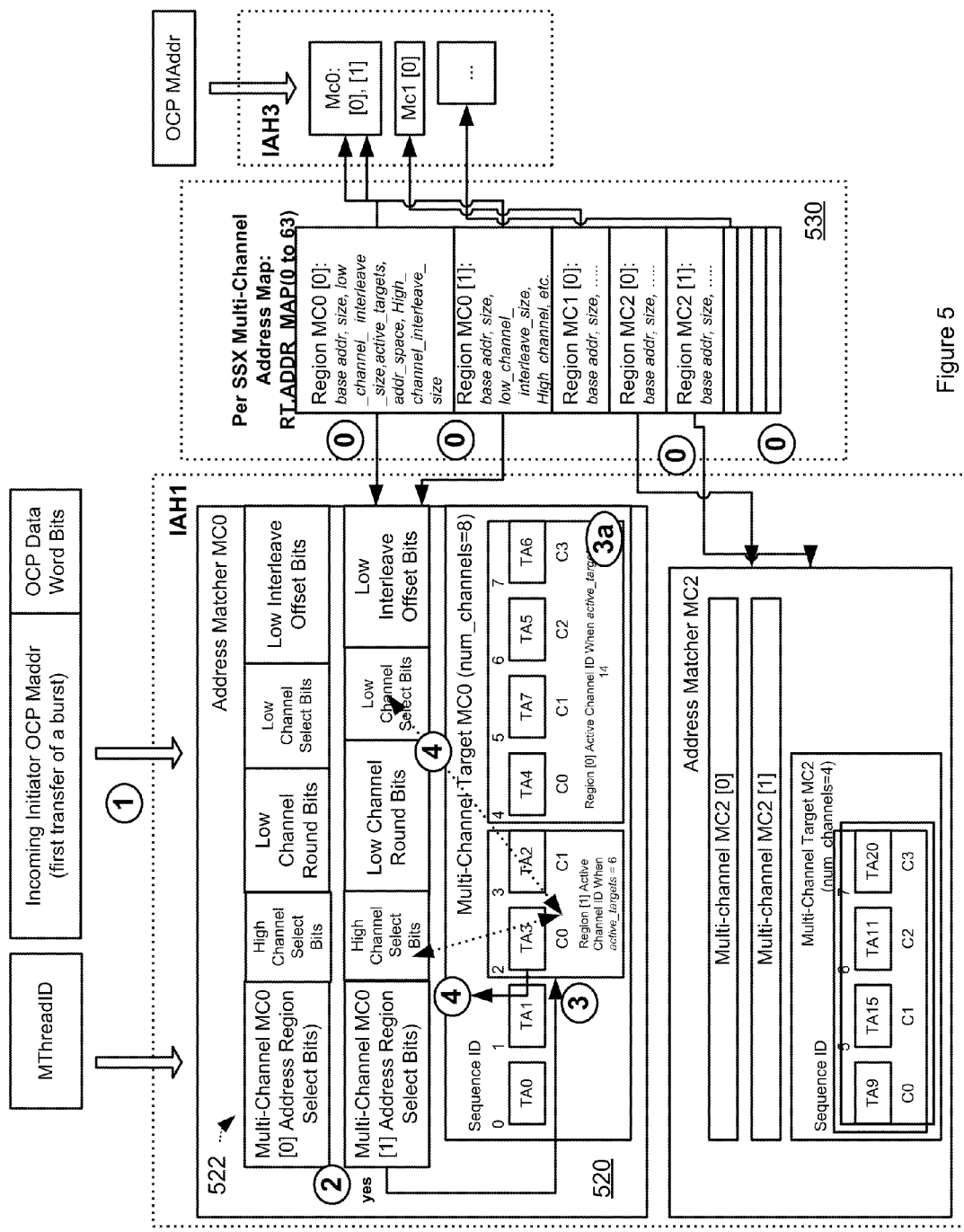
FIG. 5 illustrates an example explaining how an incoming OCP address of a request aiming at a multi-channel address region can be decoded by the address decoder logic located in the initiator agent.

FIG. 5 illustrates an example explaining how an incoming OCP address of a request aiming at a multi-channel address region can be decoded by the new multi-channel address matchers (i.e. address decoder logic) located in the initiator agent. An example incoming OCP address of a request 522 aiming at a multi-channel address region can be decoded by the new multi-channel address matchers/address decoder logic 520 located in the initiator agent. The figure shows two initiator agent units, IAH1 and IAH3 (one on each side) and a RT module, which contains all ADDR_MAP registers. The address map registers 530 having address map register bits, which carry information regarding multi-channel address regions reachable by each initiator agent, and are propagated to corresponding initiator agent units (shown as arrows labeled with (0) in FIG. 7). The address map register bits allows the multi-channel address regions of the integrated circuit design to be configurable at boot-time, as well as, to be re-programmed by software during run time.

The ADDR_MAP register block 530 (RT.ADDR_MAP) contains all attributes associated with any multi-channel address regions. A multi-channel address region is associated with a multi-channel aggregate target at design time. The multi-channel aggregate target can have an ordered set of individual targets with similar OCP parameters. The attributes of a multi-channel address region include base, size, low_channel_interleave_size, high channel interleave size, active_targets, addr_space, and num_channels. Thus, a register in the interconnect that has fields to contain attributes associated with one or more multi-channel address regions including base size, low channel interleave size, and high channel interleave size, which can be used to create the non-linear sequential channel round order.

An example multi-channel address matching process outlined as follows using initiator agent IAH1, as an example:

Matching the MAddr signal of the first transfer of an initiator burst against the base address and region size attributes of all multi-channel address regions reachable by the initiator agent IAH1—see label (1).

Once a multi-channel address region is matched against the OCP MAddr value (for instance, as shown by label (2) that MC0 region [1] is a match), initiator agent IAH1 needs to identify the active channels of the multi-channel aggregate target (MC0) associated with the address region (region [1])—see label (3). This would in turn depend on the active_targets attribute of the decoded multi-channel address region (region [1]) since the active_targets attribute encodes the ordered subset of channels of the multi-channel aggregate target that are active in the given multi-channel region. Let's assume in this example, address region[1]'s active_targets attribute is set to 6, which indicates that 2 channels, C0 and C1 represent the subset of active channels and they map to channel target agent TA3 and TA2, respectively. Note that it is possible that in the same time another address region [0], which is also associated with this same multi-channel aggregate target MC0, can have a different active_targets value—for instance, 14, to indicate that C0, C1, C2, and C3 are active and they are mapped to channel target agent TA4, TA7, TA5, and TA6, respectively—this is indicated by the red box label (3a).

Finally, MAddr bits, corresponding to the high channel select and Low Channel Select bits" as indicated by the address region [1] (through additional register field: high_channel_select_enables), are used as the channel number (e.g., MAddr[6:6] is 0=>C0) to determine the actual destination target agent (e.g., TA3) for the initiator burst. This action is labeled as (4).

The address decoding logic 520 performs multi-channel address matching using the ADDR_MAP Register Block 530.

Note, a user/system designer can analyze typical data access pattern of initiators accessing that aggregate target to determine whether to select high and low channel bit distribution patterns, and the size of channels in that region. Otherwise, a user may use a detector logic tool to analyze typical data access pattern of initiators and suggest the correct high and low channel distribution pattern and size of the channels in that region.

An example first multi-channel aggregate target MC2 consists of 4 channels structurally multi_channel_target_MC2: TA9, TA15, TA11, and TA20. The multi-channel target group has an associated address region MC2_region1.

When only two channel targets are active (at boot time) for the multichannel address region MC2_region1, the system can have something like below by specifying both low and high channel interleaving:

```
address_map {
    region MC2_region1 MC2 {
        base 0x0
        size 0x4              // 0x2000 bytes
        addr_space 0x0
        num_channels 0x4
        active_targets 0x6    // 2 active channel targets { TA2 and
                                 TA3 }
        low_channel_interleave_size 6
        high_channel_interleave_size 12
        high_channel_select_enables 0x1
    }}
```

The Multichannel Interleaved Address Region Registers 530 may have fields including a high channel select enables field and high channel interleave size field. The high channel select enables (HCS_enables) is a bit vector to be used as an input by the channel selection hash function (CSHF). This field may be ignored when NUM_CHANNELS==0x1 or (HIGH_CHANNEL_INTERLEAVE_SIZE==0x0 and exported). The High channel interleave size is the number of bits for the multi-channel address region. This field may be ignored when NUM_CHANNELS==0x1 or (HIGH_CHANNEL_INTERLEAVE_SIZE==0x0 and exported).

When the high channel interleaving feature is supported by the interconnect, these two additional attributes, high_channel_interleave_size and high_channel_select_enables, are available for each multi-channel address region. Accordingly, the mapping between low channel interleaves and active channels becomes a limited, user-selectable hash function based on low and high channel select bits.

Figure 6:
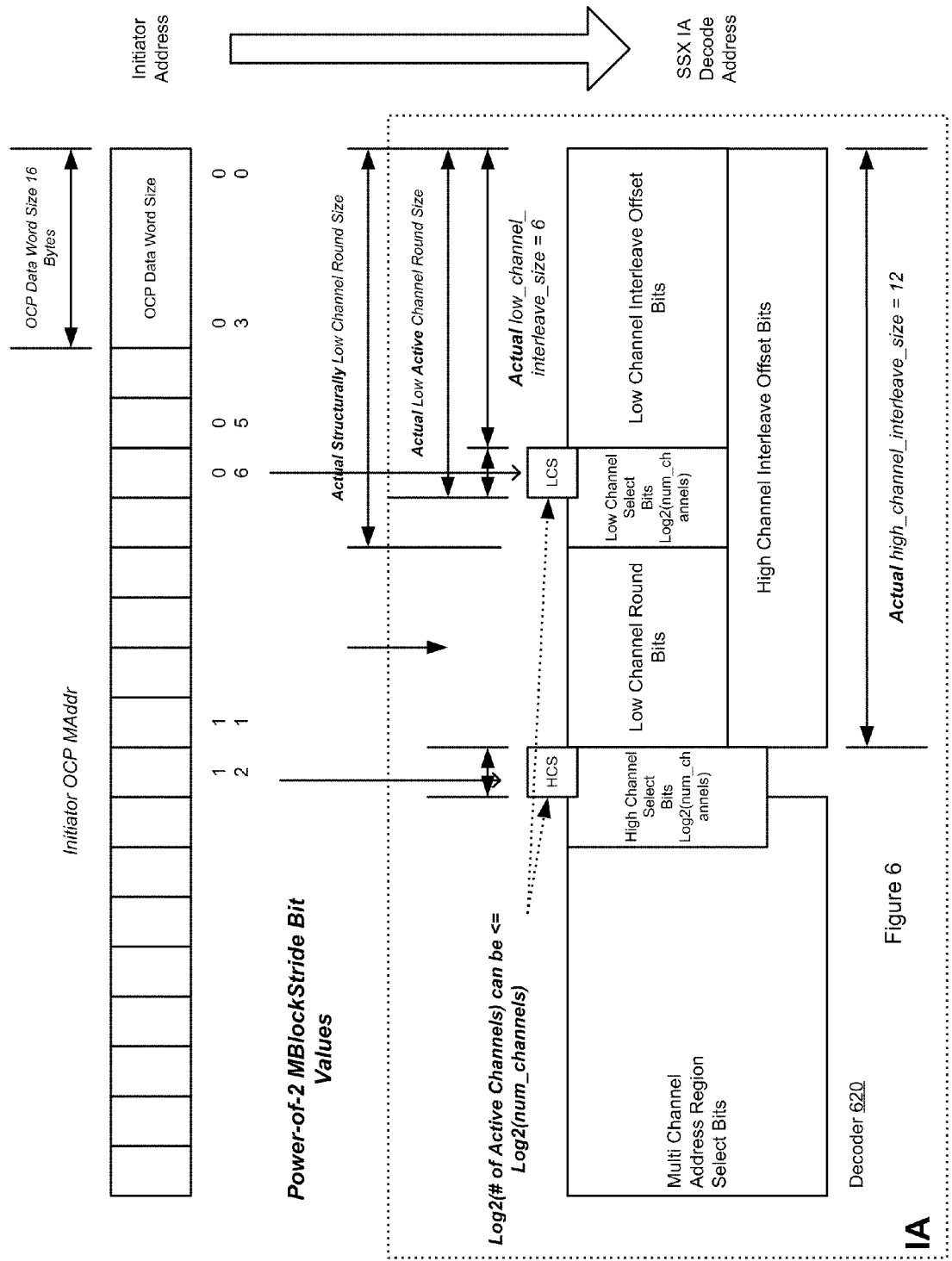
FIG. 6 illustrates another example multi-channel scheme applying the hash function to determine the destination channel target ID number.

FIG. 6 illustrates another example multi-channel scheme applying the hash function to determine the destination channel target ID number. The address decoder logic 620 uses example address bits used for DRAM address region_1's address decoding and destination channel selection. The address decoder logic 620 in the initiator agent, IA0, applies the channel selection hash function, which equals, for example, (0x1, MAddr[bit12], MAddr[bit6]), to determine the resultant destination channel target ID number.

Figure 7:
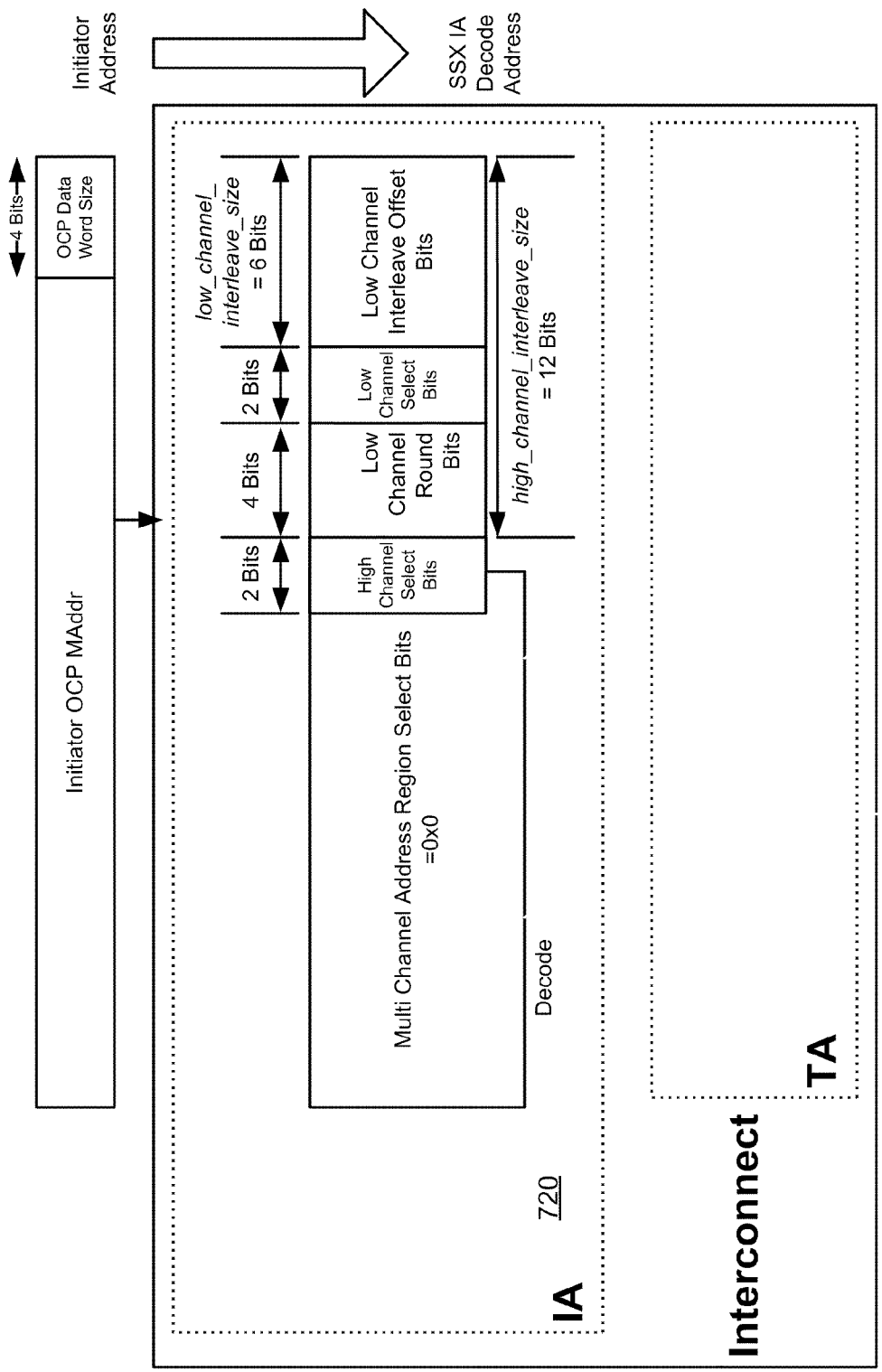
FIG. 7 illustrates an example channel selection by the address decoder logic.

FIG. 7 illustrates an example channel selection by the address decoder logic. The channel selection in the Multi-channel Address Region Base is equal to 0x0, Size=0x2000, and has 4 Active Channels in each channel round. The LCS, HCS, and HCS_enables fields are each a 2-bit vector value (A is 2, M is 2), low_channel_interleave_size=6, high_channel_interleave_size=12, and OCP data_wdth=128 (16 bytes). The address decoder logic 720 applies the hash function to these values.

FIG. 8 illustrates a chart of the potential values of the three parameters, LCS, HCS, and HCS_enable in an example address decode and the resultant destination channel generated from the applied hash function. These values are from the example Channel Selection in FIG. 7.

In this example, the Channel Select Hash Function (HCS_enable, HCS, LCS):=least signification 2 bits of ((HCS & HCS_enables)+LCS).

Assume that in this example the HCS_enables field is set to bit values of '11.' Assume also that the address region has attributes of Low Channel Interleave Size=0x40, High Channel Interleave Size=0x1000. The map address registers has values set. The potential values for each of the HCS, HCS_enables, and LCS and the resulting channel number are set out below.

| MAddr[7:6] | | MAddr[13:12] | | |
|---|---|---|---|---|
| LCS | HCS | HCS_enable | CSHF(...) | To select |
| b'00 | b'00 | b'11 | 0 × 0 | Channel 0 |
| b'01 | b'00 | b'11 | 0 × 1 | Channel 1 |
| b'10 | b'00 | b'11 | 0 × 2 | Channel 2 |
| b'11 | b'00 | b'11 | 0 × 3 | Channel 3 |
| b'00 | b'01 | b'11 | 0 × 1 | Channel 1 |
| b'01 | b'01 | b'11 | 0 × 2 | Channel 2 |
| b'10 | b'01 | b'11 | 0 × 3 | Channel 3 |
| b'11 | b'01 | b'11 | 0 × 0 | Channel 0 |

The change of the value of the bit in the high channel select field, from 00 to 01 in the fifth row of possible values, triggers a skip in sequential channel round order from channel 3 over channel 0 to channel 1.

Figure 9:
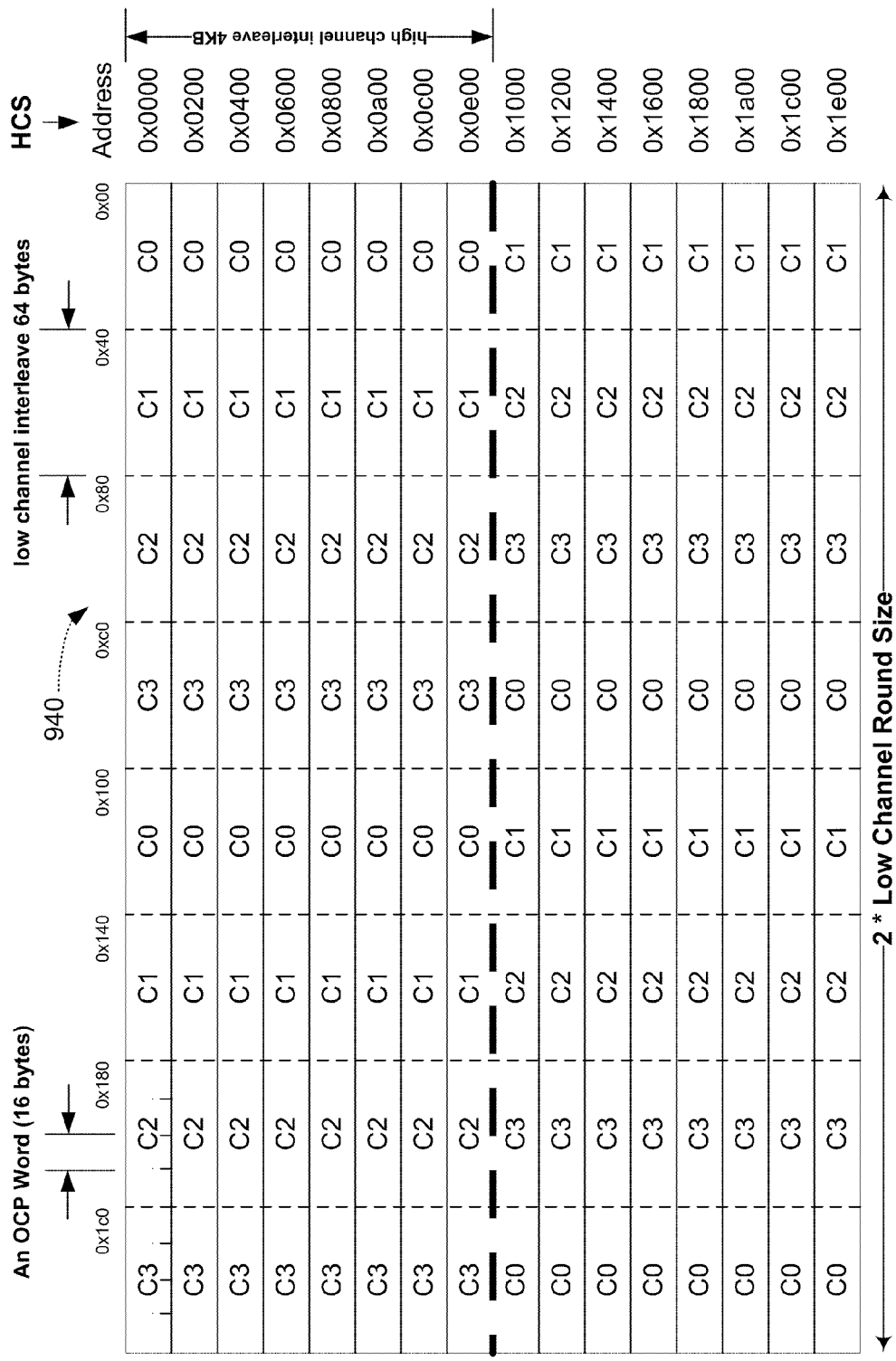
FIG. 9 illustrates a view of an example address region's high channel interleaving occurring vertically at an indicated large dashed boundary and low channel interleaving occurring horizontally at each small dashed indicated boundary.

FIG. 9 illustrates a view of an example address region's high channel interleaving occurring vertically at an indicated large dashed boundary and low channel interleaving occurring horizontally at each small dashed indicated boundary. A four channel round of channels C0-C3 populate the address space of this address region 940. High Channel Interleaving occurs vertically at the large dashed horizontal boundary line in the middle. About midway down the channel access pattern changes from going right to left changes from channel 3 going next to channel 0, to going from right to left channel 3 to channel 1 and skipping over channel 0 one time. In addition, low channel interleaving is also occurring horizontally at each of the small black-vertical dashed boundary lines.

Figure 10:
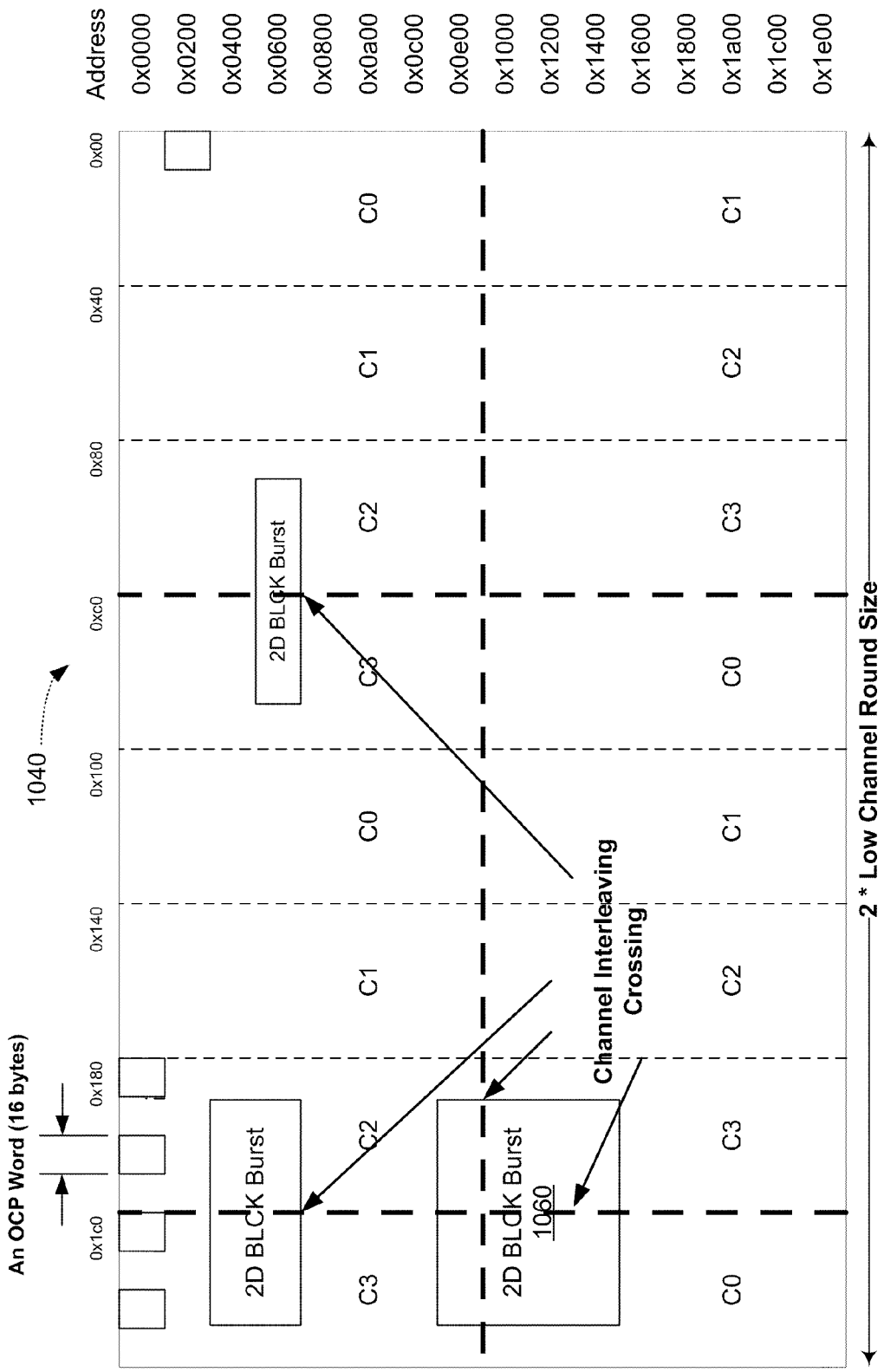
FIG. 10 illustrates another of an example address region where the individual memory segment crossing lines are removed and example burst requests are super imposed on the example address region.

FIG. 10 illustrates another of an example address region where the individual memory segment crossing lines are removed and example burst requests are super imposed on the example address region. The hash function non-linear sequential skip occurs from channel 3 over channel 0 to channel 1 in this address region 1040 based on the settings in the configuration register. One or more of the 2D BLCK Burst requests occur with both high and/or low channel interleaving occurring to service that request. The large first Burst request 1060 crosses both High and Low Channel Boundaries to C0, C2, and C3 and skips channel 1. The channel interleaving goes C2 to C3 and then c3 to c0 and then c0 to c3 skipping channel c1. High channel interleaving is used on block bursts with a stride value greater than 1. Some other 2D BLCK burst are distributed across this address region 1040, for example the second and third burst; however, they do not have high channel interleaving applied via the hash function to optimize the performance of servicing that request.

The combination of low channel interleaving plus high channel interleaving in a non-linear channel round order allows not only the horizontal channel interleaving of distributing individual requests in a block burst request across multiple channels of an aggregate target but also the vertical channel interleaving by using the optional "high" channel interleaving, where each high channel interleave contains a power-of-2 number of low channel interleaves. Thus, the traffic distribution may skip channels in its linear sequential order of the multiple channels making up an aggregate target. For instance, low channel interleaving plus high channel interleaving allows 2D BLCK bursts with large MBlockStride and MBlockHeight values to be split (legally) among more channel targets.

The address decoder logic may apply the following rule that when high_channel_interleave_size is turned off (i.e., set to 0), an initiator 2D BLCK burst with a MBlockStride==(N*Low Channel Round Size) can be delivered to channel targets as 2D BLCK bursts. However, when high_channel_interleave_size>0 (it is turned on), an initiator 2D BLCK burst can be delivered to channel targets only if its MBlockStride==($2^N$*Low Channel Round Size) where N is a non-zero integer. This rule allows the high channel interleave boundary to be easy found.

Figure 11:
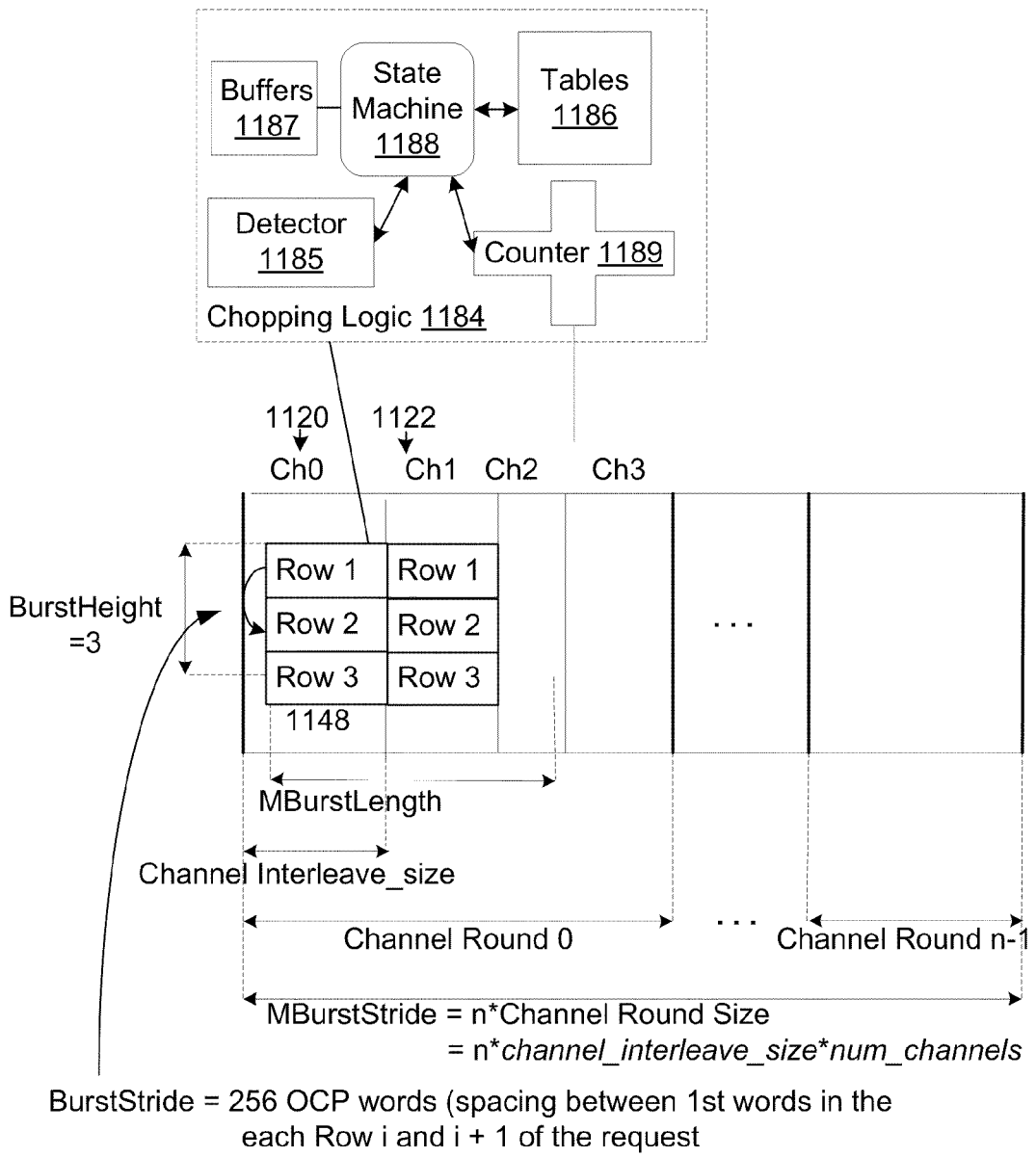
FIG. 11 illustrates a diagram of an embodiment of chopping logic in the interconnect to chop individual burst requests that cross the memory channel address boundaries from a first memory channel to a second memory channel within the first aggregate target into two or more burst transactions with a height value greater than one, as well as stride and width dimensions, which are chopped to fit within memory channel address boundaries of the first aggregate target.

Chopping Individual Transactions that Cross Channel Boundaries Headed for Channels in an Aggregate Target FIG. 11 illustrates a diagram of an embodiment of chopping logic in the interconnect to chop individual burst requests that cross the memory channel address boundaries from a first memory channel to a second memory channel within the first aggregate target into two or more burst transactions with a height value greater than one, as well as stride and width dimensions, which are chopped to fit within memory channel address boundaries of the first aggregate target.

The interconnect implements chopping logic 1184 to chop individual burst requests that cross the memory channel address boundaries from a first memory channel 1120 to a second memory channel 1122 within the first aggregate target into two or more chopped burst transactions from the same thread. The chopping logic 1184 cooperates with a detector 1185 to detect when the starting address of an initial word of requested bytes in the burst request 1148 and ending address of the last word of requested bytes in the burst request 1148 causes the requested bytes in that burst request 1148 to span across one or more channel address boundaries to fulfill all of the word requests in the burst request 1148. Note, the transactions in the burst include one or more requests and one or more optional responses. The chopping logic 1184 includes a channel chopping algorithm and one or more tables 1186 to track thread ordering in each burst request 1148 issued by an IP initiator core to maintain a global target ordering among chopped up portions of the burst request 1148 that are spread over the individual memory channels 1120 and 1122. Either in a distributed implementation with each initiator agent in the system or in a centralized memory scheduler the system may have a detector 1185, chopping logic 1184, some buffers 1187, state machine 1188, and counters 1189 to facilitate the chopping process as well as ensuring the sequential order within the original chopped transaction is maintained. The chopping logic 1184 may be configured to have all burst requests that by their destination address are intended to be distributed in a non-linear sequential channel round order in an aggregate target are issued with a power-of-two height and thus, after performing block height chopping operation on the burst request, the resulting chopped up burst requests each will have a block height value of a power of two.

The chopping logic 1184 supports transaction splitting across channels in an aggregate target. The chopping logic 1184 chops a burst when an initiator burst stays within a single address region but spans a channel boundary. The chopping logic 1184 may be embedded in an initiator agent at the interface between the interconnect and a first initiator core, or in the interconnect itself. The chopping logic 1184 chops, an initial burst request spanning across one or more memory channel address boundaries to fulfill all of the word requests in the burst request, into two or more burst requests of a same height dimension for each memory channel.

A state machine 1188 in the chopping logic chops a transaction based upon the type of burst request crossing the memory channel address boundary. The detector 1185 detects the type of burst. The detector 1185 detects for a request containing burst information that communicates one or more read requests in a burst from an initiator Intellectual Property (IP) core that are going to related addresses in a single target IP core. A burst type communicates the address sequence of the requested data within the target IP core. The state machine 1188 may perform the actual chopping of the individual transactions that cross the initial channel address boundary into two or more transactions/requests from the same thread and put chopped portions into the buffers 1187. The detector 1185 may then check whether the remaining words in the burst request cross another channel address boundary. The state machine will chop the transaction until the resulting transaction fits within a single channel's address boundary. The state machine 1188 may factor into the chop of a transaction 1) the type of burst request, 2) the starting address of initial word in the series of requests in the burst request, 3) the burst length indicating the number of words in the series of requests in the burst request, and 4) word length involved in crossing the channel address boundary.

Thus, the chopping logic 1184 in the interconnect is configured to chop a two dimensional (2D) burst request that spans across memory channel boundaries into the two or more chopped burst transactions that each still retain attributes of a 2D transaction including the requested data's stride, height and width dimensions, but fits those 2D dimensions of each of the two or more chopped burst transactions to within the boundaries of a memory channel making up the first aggregate target. The chopped 2D block burst transaction fully describes attributes of a two-dimensional data block containing annotations indicating a width length of a row occupied by target bytes, a number of rows occupied by the target bytes, and an address stride spacing between two consecutive rows occupied by the target bytes. Note, transactions in the burst request may include one or more requests and one or more optional responses to those requests.

The chopping logic 1184 may apply chopping rules differently to burst requests headed to a multi-channel-based aggregate target verses a burst requests headed to a non-multi-channel-based target.

The chopping logic 1184 chops non-BLCK initiator bursts at each channel boundary into initiator-word-sized bursts. Each non-BLCK initiator burst can cross no or many channel boundaries. BLCK initiator write bursts are chopped to rows and then treated as INCR bursts. BLCK initiator read bursts cross at most 1 channel boundary per row and can be delivered to channel target agents as BLCK read bursts. BLCK initiator read bursts that cross more than 1 channel boundary are chopped into rows of INCR bursts and then treated as INCR bursts.

FIG. 10 shows a BLCK initiator read burst 1060 that crosses the channel boundary, between channel 0 and channel 1, per row. Please note that the BLCK initiator read burst shown in FIG. 10 has an MBlockStride byte length equals to n times the Low Channel Round Size of the multi-channel address region targeted by the burst. And, the horizontal dimension of the burst 1060 equals to this "n times the Low Channel Round Size". For a BLCK initiator read burst without satisfying this MBlockStride restriction, the burst is chopped into rows of INCR bursts and then treated as INCR bursts.

Observing WRAP, XOR, and Aligned INCR Bursts Crossing Channel Boundaries

Since $2^{low\_channel\_interleave\_size}$ is a power of 2 number and WRAP and XOR bursts also have a burst byte length that is also a power of 2, if at most one channel crossing happens, a WRAP/XOR burst is bound to either completely fall into a single channel, or have a burst byte length that is exactly 2 times $2^{low\_channel\_interleave\_size}$ bytes. In the latter case and for a WRAP burst, the wrapping byte address of the burst, which is the smallest address accessed by the burst, is always equal to the starting byte address of the low channel interleave of an even channel, and the address range spans two channel interleaves.

Similarly, burst-aligned INCRs crossing at most one channel boundary either completely fall into a single channel, or have a burst byte length of 2 times $2^{low\_channel\_interleave\_size}$ bytes and a starting address that is always equal to the starting address of the low channel interleave of an even channel.

The above concept can be applied to burst-aligned INCR, or WRAP/XOR bursts crossing 3, 7, or more channel boundaries.

All BLCK read bursts issued by any inititator agent are sent with a power-of-two height. Thus, after performing a block height chopping operation on the burst request, the resulting chopped up burst requests each will have a block height value of a power of two. The power-of-2 block height simplifies any interconnect logic that is needed in order to calculate the length or end address of a burst. This is needed in three example cases:

For example, a BLCK initiator read burst that starts at MAddr and has a MBlockHeight value of 15 is chopped into a sequence of 4 BLCK read bursts with the following (after-chop MAddr, after-chop MBlockHeight) sequence before converting/sending to the target side:
(MAddr, 8); (MAddr+8*MBlockStride, 4); (MAddr+(8+4)*MBlockStride, 2); and (MAddr+(8+4+2)*MBlockStride,1).

FIG. 12 illustrates an example table for a configuration register that is user configurable.

The configuration reference register/table is user configurable. A user/designer can analyze typical data access pattern of initiator IP cores accessing the first aggregate target to determine whether to select high and low channel bit distribution patterns, and a size of channels in that region, in order to select the distribution pattern of requests amongst channels in that region. Otherwise, a user may use a detector logic tool to analyze typical data access pattern of initiators and suggest the correct high and low channel distribution pattern and size of the channels in that region. The address decoder logic pulls one or more of its variable parameters from the user configurable register reference table. The user can program in how many regions within the aggregate memory target may exist, the size of each memory channel in that region of the memory target, and whether none, low channel interleaving patterns, or low and high channel interleaving patterns for burst requests/responses will be allowed in that address region of the aggregate target.

A register in the interconnect, such as a SSX ADDR_MAP register block (RT.ADDR_MAP), has fields to contain all attributes associated with any multi-channel address regions. A multi-channel address region may be associated with a multi-channel target at design time. A multi-channel target can have an ordered set of individual targets with similar OCP parameters. The attributes of a multi-channel address region include base, size, low_channel_interleave_size, active_targets, addr_space, num_channels, high_channel_interleave_size and high_channel_select_enables. These fields are available for each multi-channel address region, and the mapping between low channel interleaves and active channels then becomes a limited, user-selectable hash function based on low and high channel select bits.

Address Tiling

Referring back to FIG. 1, the integrated circuit where the logic and components performing the address tiling function can be located within the interconnect or somewhere else in the path between the initiator and the cells of the memory bank(s) themselves. For instance, in FIG. 1 the address tiling function may be performed in the target agents 130b, the initiator agents 116b, in the memory scheduler 132b, in the memory controller 134b, as well as in another component in the interconnect 118b. The address tiling function may be shared amongst one or more of the above components. For the remainder of the description, the address tiling function will be described as primarily occurring within the memory scheduler 132 to provide example descriptions of what and how the address tiling function works. Just note, that the address tiling function may be shared across or performed within any of the above components.

The interconnect 118 implements an address map 136 with assigned address for target IP cores 124-126 in the integrated circuit 100 to route the requests between the target IP cores and initiator IP cores in the integrated circuit. A first target of the target IP cores 124-126 includes a DRAM bank of memories coupled to the memory scheduler 132 that contains two or more configurable address tiling functions to transform an incoming address of data requested in a first request to the first target to determine what physical addresses in the bank of memories will service the first request.

Figure 13:
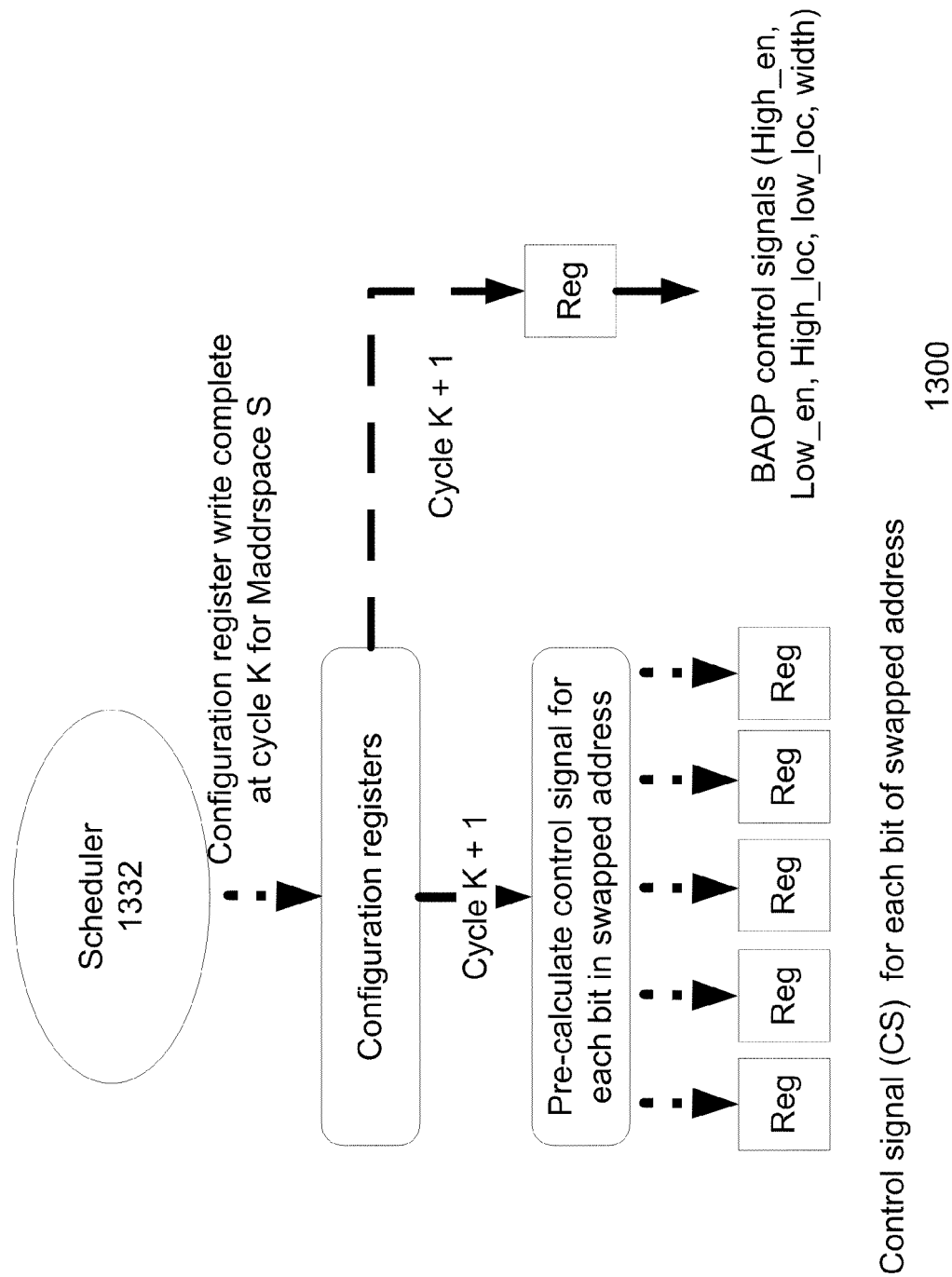
FIG. 13 illustrates an embodiment of the address tiling logic.

FIG. 13 illustrates an embodiment of the address tiling logic.

The memory scheduler 1332 contains two or more configurable address tiling functions to transform an incoming address of data requested in a request to the target memory core to determine what physical addresses in the bank of memories will service this request. The two or more configurable address tiling functions in the address tiling logic are programmable by a user to create two or more distinctly different memory regions in the target memory core. Each memory region having its own distinct tiling function based on configuration parameters 1) selected by the user and 2) stored in tiling registers. The multiple tiling functions are configured to operate concurrently in the integrated circuit.

Referring back to FIG. 1, the address space in the target memory core, such as DRAM 124, is divided to create two or more regions of memory and each region has its own distinctly different address tiling function based on the tiling register 119, 121 settings for that region. The tiling registers 119, 121 are defined to perform a tiling function of a first operation of address bit swapping in the incoming address of a request and an outgoing response, which is used to improve page hit rates of block bursts and then a second operation of applying a Boolean logic function, such as an ADD, that manipulates bank address bits in the incoming address of the request and the outgoing response, which is used to minimize back to back page misses to the same bank. Both swapping operations are configurable from a user. Low and high order address bits in the incoming address of the request are used to determine bank address manipulation operation.

The address tiling is performed on the burst request after the burst request has been chopped by chopping logic in the interconnect 118 to have a starting address of an initial word in the burst request and ending address of the last word in the burst request to fit within a bank and not span across a bank address boundaries (DRAM_BLOCK_SIZE) so no further chopping needs to occur.

In order to cater to the varied nature of application traffic, the memory scheduler 132 has logic to support seven runtime configurable tiling functions, where each tiling function is programmed into a register block.

In its most general form, address tiling refers to a transformation on the incoming address to produce an outgoing address. In the realm of DRAM memory systems, address tiling on the system address bits to generate a memory address is done primarily to improve the page hit rate in the DRAM system, and thus improve the utilization of the DRAM memory. Address tiling is a transformation on the system address bits to generate a memory address such that the page hit rate in the DRAM is improved. The configurable address tiling lets users/designers rearrange DRAM address organization to exploit 2D locality, and allows 2D data fetches with no more than one page miss or exploit any other software access pattern that the user/designer knows will be routinely accessing the DRAM.

The user can program up to seven address tiling functions into the tiling registers at runtime and all of the tiling functions may be functioning at the same time. Thus, the seven distinct tiling functions can co-exist during normal operations of the integrated circuit. Each tiling function is implemented in its own a discrete region of the memory, which applies that tiling function to at least requests and responses for data in that discrete region memory. The user can choose the tiling function for a given region that is most suitable for the application that is anticipated to be run, at runtime. Each tiling function consists of an address swapping stage and then a bank-address transformation stage but calculated in parallel with the address swapping stage. Each tiling function is specified by populating the fields of the two address tiling registers in the memory scheduler. The first register is used to specify the address swapping parameters, and the second register is used to specify the bank-address transformation parameters.

The interconnect 118 may maintain request path order; maintain response path order; interleave channels in an aggregate target with unconstrained burst sizes; have configurable parameters for channels in an aggregate target; chop individual transactions that cross channel boundaries headed for channels in an aggregate target; chop individual transactions that cross channel boundaries headed for channels in an aggregate target so that two or more or the chopped portions retain their 2D burst attributes, as well as implement many other internal controls.

Figure 14:
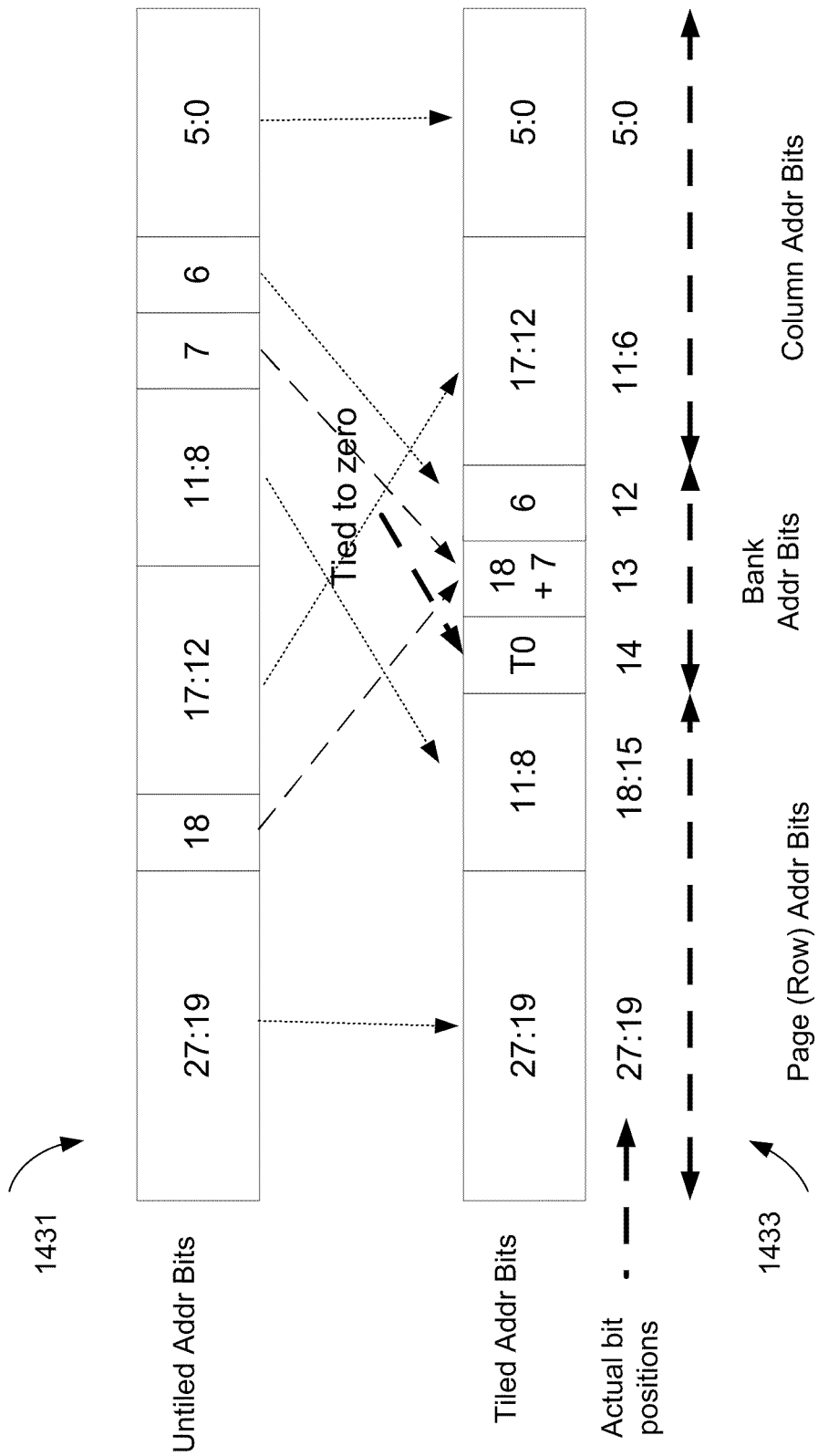
FIG. 14 illustrates each tiling function consists of the address swapping stage and/or the bank-address transformation stage occurring on an address in a request.

FIG. 14 illustrates each tiling function consists of the address swapping stage and/or the bank-address transformation stage occurring on an address in a request. As discussed, the first register in the tiling registers is used to specify the address swapping parameters and a second register is used to specify the bank-address transformation parameters and the bank address transformation calculation is performed in parallel with the address swapping.

As discussed, in each tiling function, address bits are re-arranged by a first transformation operation of Address Swapping in groups and at one or two different places. For example, as shown in FIG. 14, bits in positions 11 thru 8 in the un-tiled address 1431 are shifted to bits in positions 18 thru 15 in the tiled address 1433. Similarly, bits in positions 17 thru 12 in the un-tiled address 1431 are shifted to bits in positions 11 thru 6 of the tiled address 1433. The second-type of transformation pertains to the selection of the bank bits (referred to as a "Bank-Address Operation" or BAOP). This transformation can happen in multiple bits among the bank address bits. For instance, bit 14 of the tiled bank address 1433 bits is tied to 0, indicating that only two bank bits (bits 13 and 12 can form any Boolean combination correspondingly 4 banks) are used in the system. The BAOP function also causes the value of the bit in the 13th position of the tiled bank address bits 1433 to be obtained by performing a Boolean ADD of the bits in the 18th and 7th position of the un-tiled address 1431 and obtaining the LSB of the sum. The operations of which position bits to swap as a group and which bits to perform the Boolean BAOP function on is programmed into the address tiling registers. However, the bits used in the BAOP were different from the position bits used in the address swap. Thus, the tiling registers are defined in such to perform a tiling function of a first operation of address bit swapping in the incoming address of the first request, which is used to improve page hit rates of block bursts, and then a second operation of applying a Boolean logic function, such as an ADD, XOR, etc., that manipulates bank address bits in the incoming address of the first request, which is used to minimize back to back page misses to the same bank.

Thus, the address tiling function is located anywhere in or between the initiator and target memory itself. Also, low and high order address bits are used to determine bank address swapping operation. Thus, bit 7 from the lower order of the address is used in this example and bit 18 from the higher order of the address is also used in this example.

The bank address operations could also be used to obtain a "checker board" type addressing pattern.

The first swapping transformation operation is used to re-order the address bits of an un-tiled address into a more memory friendly address for the type of application anticipated to be using that region of the memory and the Boolean logic performed on the bank address bits is an ADD function used to select a different bank in the event of a page miss, such that page pre-charge costs are reduced, and both swapping operations are configurable from a user.

The address swapping operation accounts for different stride values used in requests and increases page hits to ensure that a page miss moves the DRAM to charge up data to retrieve from a new bank. Thus, maximizes page hits in the DRAM memory and minimizes DRAM page misses and thereby eliminates lost cycles associated with the pre-charge stage of a page miss.

Figure 15:
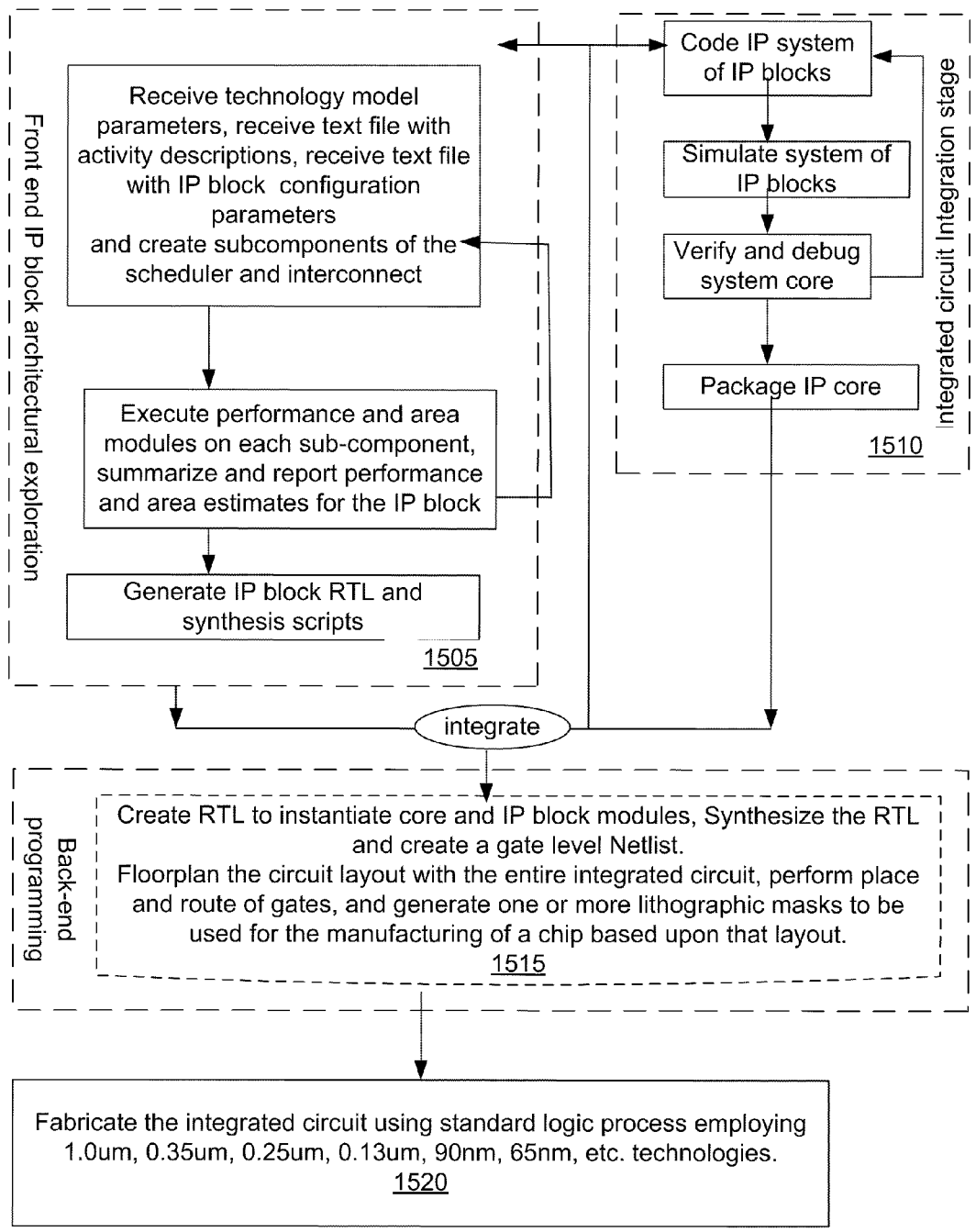
FIG. 15 illustrates a flow diagram of an embodiment of an example of a process for generating a device, such as a System on a Chip, with the designs and concepts discussed above for the Interconnect and Memory Scheduler.

FIG. 15 illustrates a flow diagram of an embodiment of an example of a process for generating a device, such as a System on a Chip, with the designs and concepts discussed above for the Interconnect and Memory Scheduler. The example process for generating a device with designs of the Interconnect and Memory Scheduler may utilize an electronic circuit design generator, such as a System on a Chip compiler, to form part of an Electronic Design Automation (EDA) toolset. Hardware logic, coded software, and a combination of both may be used to implement the following design process steps using an embodiment of the EDA toolset. The EDA toolset such may be a single tool or a compilation of two or more discrete tools. The information representing the apparatuses and/or methods for the circuitry in the Interconnect Memory Scheduler, etc. may be contained in an instance such as in a cell library, soft instructions in an electronic circuit design generator, or similar machine-readable storage medium storing this information. The information representing the apparatuses and/or methods stored on the machine-readable storage medium may be used in the process of creating the apparatuses, or representations of the apparatuses such as simulations and lithographic masks, and/or methods described herein.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium.

Generally, the EDA toolset is used in two major stages of SOC design: front-end processing and back-end programming. The EDA toolset can include one or more of a RTL generator, logic synthesis scripts, a full verification testbench, and SystemC models.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 1505, the EDA tool set may receive a user-supplied text file having data describing configuration parameters and a design for at least part of a scheduler having multiple tiling functions. The data may include one or more configuration parameters for that IP block. The IP block description may be an overall functionality of that IP block such as an Interconnect, memory scheduler, etc. The configuration parameters for the Interconnect IP block and scheduler may include parameters as described previously.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 1510, a separate design path in an ASIC or SOC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations, such as software coded models, to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 1515, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 1520, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCPDis2 to display socket activity, OCPPerf2 to analyze performance of a bundle, as well as other similar programs.

As discussed, an EDA tool set may be implemented in software as a set of data and instructions, such as an Instance in a software library callable to other programs or an EDA tool set consisting of an executable program with the software cell library in one program, stored on a non-transitory machine-readable storage medium. A non-transitory machine-readable storage medium may include any mechanism that provides (e.g., stores and/or transmits) information in a form readable by a machine (e.g., a computer). For example, a non-transitory machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In an embodiment, the logic consists of electronic circuits that follow the rules of Boolean Logic, software that contain patterns of instructions, or any combination of both. Various components described above may be implemented in hardware logic, software, or any combination of both.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

We claim:

1. An interconnect for an integrated circuit to communicate transactions between one or more initiator Intellectual Property (IP) cores and multiple target IP cores, comprising:
   two or more memory channels that make up a first aggregate target of the target IP cores, and the two or more memory channels populate an address space assigned to the first aggregate target and appear as a single target to the initiator IP cores;
   two or more configurable address tiling functions to transform an incoming address of data requested in a request to a target memory IP core to determine what physical addresses in a bank of memories will service this request;
   chopping logic configured to chop individual burst requests that cross the memory channel address boundaries from a first memory channel to a second memory channel within the first aggregate target into two or more resulting chopped burst transactions with a height value greater than one, as well as stride and width dimensions, which are chopped to fit within memory channel address boundaries of the first aggregate target; and
   address decoding logic that is configured to implement a distribution of requests from the chopped burst transactions to the two or more memory channels making up the first aggregate target, where the address decoding logic implements a channel-selection hash function to enable requests from a first chopped burst transaction to be distributed amongst the two or more channels in a non-linear sequential pattern in channel round order that make up the first aggregate target.

2. The interconnect for the integrated circuit of claim 1, wherein the address decoding logic distributes requests from the first chopped burst transaction across the two or more memory channels to enable selectable skipping over one or more particular memory channels in channel round order in the first aggregate target when distributing the requests from the first chopped burst transaction to the two or more channels making up the first aggregate target based on the channel-selection hash function, wherein which one or more memory channels are selectably skipped in the non-linear sequential distribution pattern is configurably set by a user.

3. The interconnect for the integrated circuit of claim 1, wherein the address decoding logic uses the channel-selection hash function to interpret address bits in two or more separate sections of a request's address header to distribute individual requests in a block burst request across multiple memory channels of an aggregate target in a distribution pattern that is non-sequentially linear in channel order, and the address decoding logic uses the bits in a high channel select bits field and a low channel select bits in the request's address header in the channel-selection hash function to determine a memory channel ID number of where a particular request will be sent.

4. The interconnect for the integrated circuit of claim 1, wherein the address decoder logic located in a first initiator agent uses low and high channel interleaving attributes for multi-channel address region decoding, in which the channel-selection hash function is applied to an address bit format of the request to achieve a non-linear high and low channel interleaving pattern in channel round order.

5. The interconnect for the integrated circuit of claim 1, wherein the address decoding logic examines a burst request's address from a first initiator IP core, applies an address decoding operation including the channel-selection hash function, and directs each request in the chopped burst transaction to the appropriate physical address associated with its corresponding destination memory channel within the first aggregate target; and the chopping logic in the interconnect is configured to chop a two dimensional (2D) burst request that spans across memory channel boundaries into the two or more chopped burst transactions that each still retain attributes of a 2D transaction including the requested data's stride, height and width dimensions, but fits those 2D dimensions of each of the two or more burst requests to within the boundaries of a memory channel making up the first aggregate target, wherein transactions in the burst request include one or more requests and one or more optional responses.

6. The interconnect for the integrated circuit of claim 1, wherein the address decoding logic interpolates bit values in a standard address format of a burst request as at least three distinct fields whose values are used in the channel-selection hash function to determine the target ID of the corresponding memory channel in order to route the request in the first aggregate memory target, and the chopping logic includes a channel chopping algorithm and one or more tables to track thread ordering in each burst request issued by a first initiator IP core to maintain a global target ordering among chopped up portions of the burst request that are spread over the individual memory channels in the first aggregate target.

7. The interconnect for the integrated circuit of claim 1, wherein the address decoding logic is located in an initiator agent and each initiator agent that has a connection to an aggregate target is instantiated with one address decoder logic unit per multi-channel address region associated with the first aggregate target.

8. The interconnect for the integrated circuit of claim 1, wherein the hash function may be turned off and not applied to the first chopped burst transaction when a user enters a specific value in a channel configuration register; and the address decoder logic would just use low channel select bits in the address of the burst request to create a balanced traffic splitting among active memory channels in the first aggregate target in a linear sequential channel round order.

9. The interconnect for the integrated circuit of claim 1, wherein the chopping logic is configured to have all chopped burst transactions that by their destination address are intended to be distributed in the non-linear sequential pattern in channel round order in the aggregate target are issued with a power-of-two height; and thus, after performing block height chopping operation on the burst request, the resulting first chopped up burst transactions each will have a block height value of a power of two.

10. The interconnect for the integrated circuit of claim 1, further comprising:

address map registers having address map register bits, which carry information regarding multi-channel address regions reachable by each initiator agent, and are propagated to corresponding initiator agent units, wherein the address map register bits enable the multi-channel address regions of the integrated circuit design to be configurable at boot-time, as well as, to be re-programmed by software during run time.

11. The interconnect for the integrated circuit of claim 1, further comprising:

a configuration reference table that is user configurable, wherein a user can analyze typical data access pattern of initiator IP cores accessing the first aggregate target to determine whether to select high and low channel bit distribution patterns, and a size of channels in that region, in order to select the distribution pattern of requests amongst channels in that region, and the address decode logic pulls one or more of its variable parameters from the user configurable register reference table.

12. The interconnect for the integrated circuit of claim 1, further comprising:

a register in the interconnect that has fields to contain attributes associated with one or more multi-channel address regions including base size, low channel interleave size, and high channel interleave size, which can be used to create the non-linear sequential pattern in channel round order.

13. The interconnect for the integrated circuit of claim 1, where the two or more configurable address tiling functions in the address tiling logic are programmable by a user to create two or more distinctly different memory regions in the target memory IP core, and each memory region having its own distinct tiling function based on configuration parameters 1) selected by the user and 2) stored in these tiling registers, and the multiple tiling functions are configured to operate concurrently in the integrated circuit.

14. The interconnect for the integrated circuit of claim 13, further comprising:

address tiling logic configured to perform a tiling function of a first operation of address bit swapping in an address of a request, which is used to improve page hit rates of block bursts, and then a second operation of applying a Boolean logic function that manipulates bank address bits in the incoming address of the request, which is used to minimize back to back page misses to the same bank, where low and high order address bits in the incoming address of the request are used to determine bank address manipulation operation.

15. A non-transitory machine-readable medium having data and instructions stored thereon, which, when executed by a machine, cause the machine to generate a representation of the apparatus of claim 1.

16. A method for communicating in an integrated circuit, comprising:
communicating transactions between one or more initiator IP cores and multiple target IP cores coupled to an interconnect, wherein the interconnect implements an address map with assigned address for the multiple target IP cores, including a first aggregate target with two or more memory channels that appears as a single target to the initiator IP cores;
detecting when a starting address of a burst request and ending address of requested bytes in the burst request causes the requested bytes in that burst request to span across one or more channel address boundaries to fulfill the burst request;
chopping the burst request that crosses the memory channel address boundaries from a first memory channel to a second memory channel within the first aggregate target into two or more chopped burst transactions that still retain attributes of a 2D transaction including the 2D data's stride, height, and width, dimensions in the first aggregate target, which are chopped to fit within memory channel boundaries of the first aggregate target; and
address decoding to implement a distribution of requests from the two or more first chopped burst transactions to the two or more memory channels making up the first aggregate target, where the address decoding implements a channel-selection hash function to enable requests from a first chopped burst transaction to be distributed amongst the two or more channels in a non-linear sequential pattern in channel round order that make up the first aggregate target, and
populating values, 1) at boot-time, 2) during run time, and 3) any combination of the two, for address map register bits to enable a multi-channel address region of an integrated circuit design to turn on whether the channel-selection hash function will be applied to requests in burst request indicated by their destination address to be serviced within that multi-channel address region.

17. The method of claim 16, further comprising:
interpolating bit values in a standard address format of a burst request now as distinct fields whose values are used in the channel-selection hash function;
skipping over one or more particular memory channels in channel round order in the first aggregate target when distributing the requests from the first chopped burst transaction to the two or more memory channels making up the first aggregate target based on the channel-selection hash function;
chopping a 2D burst request that spans across memory channel boundaries into the two or more chopped burst transactions that each still retain attributes of a 2D transaction including the requested data's stride, height and width dimensions, but fits those 2D dimensions of each of the two or more burst requests to within the boundaries of a memory channel making up the first aggregate target.

18. A non-transitory machine-readable medium having data and instructions stored thereon, which, when executed by a machine, cause the machine to perform the method of claim 16.

19. An Integrated Circuit, comprising:
an interconnect to communicate requests between multiple initiator IP cores and multiple target IP cores, wherein the interconnect implements an address map with assigned address for target IP cores, including two or more memory channels making up a first aggregate target, in the integrated circuit to assist in routing the requests between the target IP cores and initiator IP cores in the integrated circuit, wherein the two or more memory channels populate an address space assigned to the first aggregate target and appear as a single target to the initiator IP cores, and the interconnect is configured to implement chopping logic to chop individual burst requests that cross the memory channel address boundaries from a first memory channel to a second memory channel within the first aggregate target into two or more chopped burst transactions, which are chopped to fit within memory channel address boundaries of the first aggregate target; and
address decoding logic that is configured to implement a distribution of requests from the chopped burst transactions to the two or more memory channels making up the first aggregate target, where the address decoding logic implements a channel-selection hash function to enable requests from a first chopped burst request to be distributed amongst the two or more channels in a non-linear sequential pattern in channel round order that make up the first aggregate target, wherein the address decoder logic located in a first initiator agent uses low and high channel interleaving attributes for multi-channel address region decoding, in which the channel-selection hash function is applied to an address bit format of the request to achieve a non-linear high and low channel interleaving pattern in channel round order, wherein the address decoding logic uses the channel-selection hash function to interpret address bits in two or more separate sections of a request's address header to distribute individual requests in the first chopped burst transaction across multiple memory channels of an aggregate target in a distribution pattern that is non-sequentially linear in channel order.

20. The interconnect for the integrated circuit of claim 19, wherein the address decoding logic uses bits in a high channel select bits field and bits in a low channel select bits field in the request's address header in the channel-selection hash function to determine a channel ID number of where a particular request will be sent, and the channel-selection hash function enable selectable skipping over one or more particular memory channels in channel round order in the first aggregate target when distributing requests from the first chopped burst transaction, wherein which one or more memory channels are selectably skipped in the non-linear sequential distribution pattern is configurably set by a user.

* * * * *